US012584573B2

(12) United States Patent
Mohamed Zain et al.

(10) Patent No.: US 12,584,573 B2
(45) Date of Patent: Mar. 24, 2026

(54) FLANGE ASSEMBLY

(71) Applicant: Schlumberger Technology Corporation, Sugar Land, TX (US)

(72) Inventors: Muhammad Fuad Bin Mohamed Zain, Singapore (SG); Gobinath Chandrahasan, Singapore (SG); Linyuan Zhan, Singapore (SG); Zhi Hong Tan, Singapore (SG)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/886,260

(22) Filed: Sep. 16, 2024

(65) Prior Publication Data

US 2026/0078850 A1     Mar. 19, 2026

(51) Int. Cl.
F16L 23/18 (2006.01)

(52) U.S. Cl.
CPC .................................... F16L 23/18 (2013.01)

(58) Field of Classification Search
CPC ................................. F16L 23/16; F16L 23/18
See application file for complete search history.

(56) References Cited

U.S. PATENT DOCUMENTS

| 9,261,194 B2 * | 2/2016 | Kesler | F16L 23/032 |
| 2007/0236008 A1 * | 10/2007 | Kim | B60H 1/00571 |
| | | | 285/206 |

| 2008/0226862 A1 * | 9/2008 | Spurrell | B29C 43/027 |
| | | | 264/79 |
| 2009/0115188 A1 * | 5/2009 | Howard | F16L 23/032 |
| | | | 285/332 |
| 2010/0230960 A1 * | 9/2010 | Konecny | F16L 23/20 |
| | | | 285/336 |
| 2010/0230962 A1 * | 9/2010 | Bongiorno | F16J 15/061 |
| | | | 277/626 |
| 2011/0031745 A1 * | 2/2011 | Nakata | F16L 19/025 |
| | | | 285/379 |
| 2011/0210545 A1 * | 9/2011 | Kesler | F16L 41/086 |
| | | | 285/336 |
| 2012/0074694 A1 * | 3/2012 | Butte | F16L 23/12 |
| | | | 277/609 |

(Continued)

FOREIGN PATENT DOCUMENTS

| GB | 1437343 A | * | 5/1976 | ............. F16L 17/06 |
| WO | 2015064824 A1 | | 5/2015 | |

*Primary Examiner* — Eugene G Byrd
(74) *Attorney, Agent, or Firm* — Kyle R. Miiller

(57) ABSTRACT

An assembly can include a flange that includes a bore wall, a seal recess, and a radially extending surface between the bore wall and the seal recess; another flange that includes a bore wall, a seal recess, and a radially extending surface between the bore wall and the seal recess; a joint component seated in part in each of the seal recesses to form a primary seal and an axial gap between the radially extending surfaces; and a disk-shaped joint component seated radially inwardly from the metallic joint component, where the disk-shaped joint component includes lips at an inner perimeter that contact the radially extending surfaces to form a secondary seal, and where the disk-shaped joint component includes a disk portion that extends radially outwardly from the lips with a disk portion axial dimension that is less than an axial dimension of the lips and less than the gap dimension.

20 Claims, 18 Drawing Sheets

(56) References Cited

U.S. PATENT DOCUMENTS

| | | | | |
|---|---|---|---|---|
| 2016/0138172 A1* | 5/2016 | Al-Buraiki | .............. | F16L 23/18 |
| | | | | 204/196.15 |
| 2018/0058616 A1* | 3/2018 | Rowley | ................. | F16J 15/104 |
| 2018/0135755 A1* | 5/2018 | McKay | ................... | F16L 23/20 |
| 2020/0124176 A1* | 4/2020 | Keeney-Ritchie | ..... | F16J 15/061 |
| 2022/0221057 A1* | 7/2022 | McKay | ................. | F16J 15/061 |
| 2024/0401728 A1* | 12/2024 | Mitchell | ............... | F16B 7/0426 |

* cited by examiner

MPFM <u>208</u>

380

381

382

385

387

384

386

388

383

Method 1200

1510

1520

1530

FLANGE ASSEMBLY

BACKGROUND

A flange assembly may form a joint between pieces of equipment. For example, a flange assembly may form a joint between a sensor unit and a pipe where fluid flows from a bore of the pipe to a bore of the sensor unit. In such an example, over time and depending on conditions, the joint may be prone to leakage. For example, consider leakage caused by corrosion. In various instances, high-performance alloys may be utilized and/or one or more other materials that may form a protective metal oxide layer (e.g., a passivation layer or passive film). However, where crevices are present along with water, oxygen and dissolved salt, a localized environment may develop that can destroy a metal oxide layer and/or hinder reformation thereof. Under such circumstances, a metallic material may be subject to relatively rapid degradation, which may, in turn, result in fluid leakage. Where a sensor unit is expected to have a lifetime that may be, for example, greater than 5 years, corrosion such as crevice corrosion may have a detrimental impact on the expected lifetime, which may result in expenditure of resources to service, replace, etc., the sensor unit. Where such a sensor unit is at a remote location, which may be difficult to access, resource expenditures to service, replace, etc., may be determinative as to whether or not to install such a sensor unit in the first place. Hence, a robust flange assembly may provide for meeting desirable lifetimes and, for example, broadening use of various types of equipment (e.g., sensor units, etc.).

SUMMARY

An assembly can include a metallic equipment flange that includes an axially extending bore wall, a seal recess disposed at a radial distance from the axially extending bore wall, and a radially extending surface between the axially extending bore wall and the seal recess; a metallic pipe flange that includes an axially extending bore wall, a seal recess disposed at a radial distance from the axially extending bore wall, and a radially extending surface between the axially extending bore wall and the seal recess; a metallic joint component seated in part in each of the seal recesses to form a primary seal and to create an axial gap between the radially extending surfaces with a gap dimension; and a disk-shaped joint component seated radially inwardly from the metallic joint component, where the disk-shaped joint component includes axially extending lips at an inner perimeter that contact the radially extending surfaces to form a secondary seal therebetween, and where the disk-shaped joint component includes a disk portion that extends radially outwardly from the axially extending lips with a disk portion axial dimension that is less than an axial dimension of the axially extending lips and less than the gap dimension. Various other apparatuses, assemblies, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

This description is not to be taken in a limiting sense, but rather is made merely for the purpose of describing the general principles of the implementations. The scope of the described implementations should be ascertained with reference to the issued claims.

Figure 1:
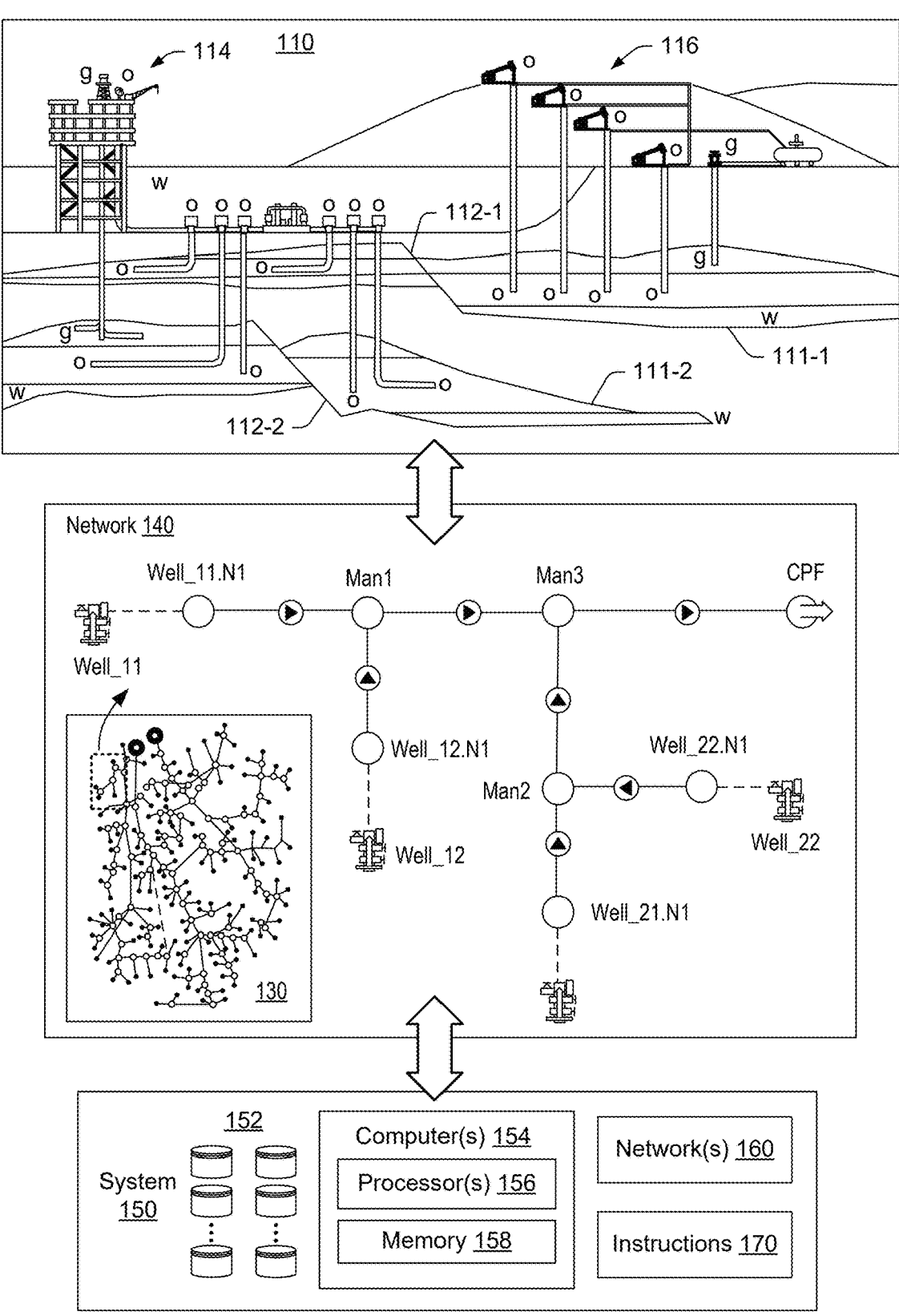
FIG. 1 illustrates an example system that includes various framework components associated with one or more geologic environments.

FIG. 1 shows an example of a geologic environment 110 that includes reservoirs 111-1 and 111-2, which may be faulted by faults 112-1 and 112-2, an example of a network of equipment 130, an enlarged view of a portion of the network of equipment 130, referred to as network 140, and an example of a system 150. FIG. 1 shows some examples of offshore equipment 114 for oil and gas operations related to the reservoir 111-2 and onshore equipment 116 for oil and gas operations related to the reservoir 111-1.

In the example of FIG. 1, the various equipment 114 and 116 can include drilling equipment, wireline equipment, production equipment, etc. For example, consider the equipment 114 as including a drilling rig that can drill into a formation to reach a reservoir target where a well can be completed for production of hydrocarbons.

In FIG. 1, the network 140 can be an example of a relatively small production system network. As shown, the network 140 forms somewhat of a tree like structure where flowlines represent branches (e.g., segments) and junctions represent nodes. As shown in FIG. 1, the network 140 provides for transportation of oil (o) and gas (g) fluids from well locations along flowlines interconnected at junctions with final delivery at a central processing facility.

In the example of FIG. 1, various portions of the network 140 may include conduit. For example, consider a perspective view of a geologic environment that includes two conduits which may be a conduit to a manifold Man1 and a conduit to Man3 in the network 140. A multiphase flowmeter (MPFM) may be installed at the flowline of each well (Well_11, Well_12, Well_22, etc.) to provide continuous production data of each well, for example, consider one or more of a gas flow rate, an oil flow rate and a water flowrate, for production allocation, production management, or for improved reservoir modeling (e.g., production history matching, forecasting).

As shown in FIG. 1, the example system 150 includes one or more information storage devices 152, one or more computers 154, one or more networks 160 and instructions 170 (e.g., organized as one or more sets of instructions). As to the one or more computers 154, each computer may include one or more processors (e.g., or processing cores) 156 and memory 158 for storing the instructions 170 (e.g., one or more sets of instructions), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 152. As an example, information that may be stored in one or more of the storage devices 152 may include information about equipment, location of equipment, orientation of equipment, fluid characteristics, well production data etc.

As an example, the instructions 170 can include instructions (e.g., stored in the memory 158) executable by at least one of the one or more processors 156 to instruct the system 150 to perform various actions. As an example, one or more methods, techniques, etc. may be performed using one or more sets of instructions, which may be, for example, the instructions 170 of FIG. 1.

Figure 2:
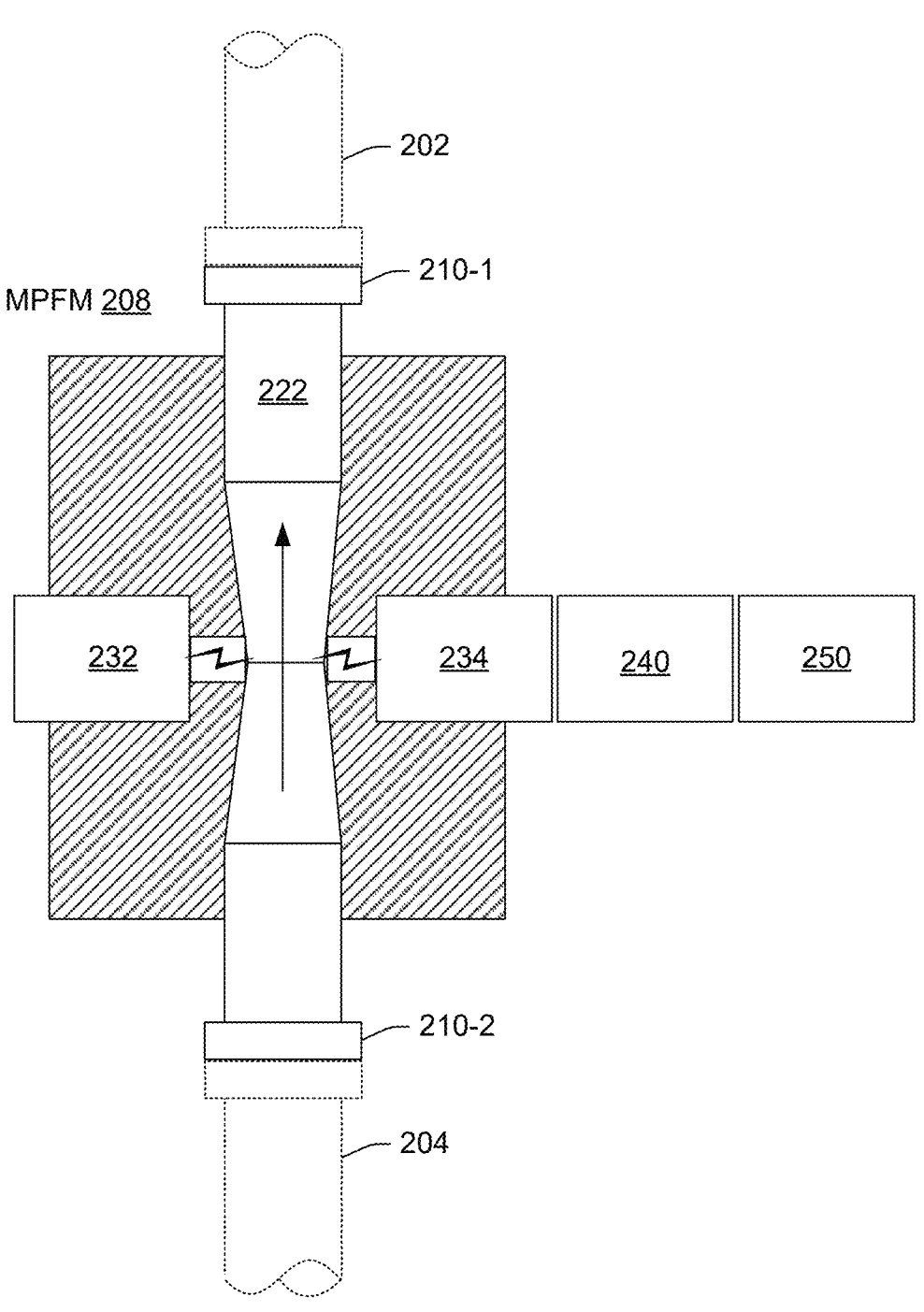
FIG. 2 illustrates an example of an assembly.

FIG. 2 shows an example of an assembly 200 that includes a multi-phase flow meter (MPFM) 208 bolted into a pipeline via pipeline flanges 202 and 204. In such an example, the MPFM 208 can include flanges 210-1 and 210-2 that are bolted to the pipeline flanges 202 and 204, respectively. In such an example, the materials of the flanges 210-1 and 210-2 may differ from one or more materials of the pipeline flanges 202 and 204. For example, the flanges 210-1 and 210-2 may be formed of a selected high-performance alloy or alloys while the pipeline flanges 202 and 204 may be formed of a material such as carbon steel.

Carbon steel may be defined as an iron-carbon alloy that contains up to approximately 2.1 weight percent carbon. For carbon steels, there tends to be no minimum specified content of other alloying elements, however, they may contain manganese. As an example, for carbon steel, the maximum manganese, silicon and copper content may be less than approximately 1.65 weight percent.

As to high-performance alloys, consider, for example, an INCONEL alloy, which may be defined as a nickel-chromium-based superalloy. An INCONEL alloy may be suitable for use in relatively extreme environments where components are subjected to high temperature, pressure, and/or mechanical loads. INCONEL alloys tend to be oxidation- and corrosion-resistant. When heated, INCONEL alloys may form a relatively thick, stable, passivating oxide layer (e.g., passive film) that may help to protect an INCONEL alloy surface from attack. INCONEL alloys tend to retain strength over a relatively wide temperature range, which may make them suitable for various high-temperature applications where aluminum and steel may succumb to creep as a result of thermally-induced crystal vacancies. The strength of INCONEL alloys, with respect to high-temperature strength, may be developed by solid solution strengthening and/or precipitation hardening (e.g., depending on particular INCONEL alloy).

As an example, an MPFM such as the MPFM 208 may be a relatively costly type of flow meter where factors such as installation, maintenance, lifespan, etc., may be taken into account. As an example, an MPFM may be specified to have a lifespan that may be greater than 5 years, greater than 10 years, greater than 15 years, greater than 20 years, greater than 25 years, etc. For example, the MPFM 208 may be expected to operate properly for 25 years.

As to points of failure of an MPFM, a joint formed between flanges may be subject to corrosion that may lead to leakage. If leakage is due to corrosion of a flange of the MPFM, that may demand replacement and/or servicing of the MPFM; whereas, if leakage is due to corrosion of a pipeline flange, that may demand replacement and/or servicing of the pipeline. In various instances, depending on conditions, age, etc., corrosion of a pipeline flange and corrosion of an MPFM flange may be contributing to leakage; noting that a joint component (e.g., a gasket or seal) disposed between flanges may be a source of leakage (e.g., in part or in whole).

As shown, the MPFM 208 can include a Venturi conduit 222, a gamma ray radioactive source 232, a detector 234, a processor 240 with associated memory and an interface 250, which may be a wired and/or a wireless network interface (e.g., network interface circuitry). As shown by an arrow, fluid can flow in the Venturi conduit 222 while emissions from the gamma ray sources 232 interact with the fluid in the throat section of the Venturi conduit 222 and where at least partial emissions can be detected by the detector 234. The processor 240 can be operatively coupled to the source 232 and the detector 234 for purposes of control and signal processing.

While a radioactive source is mentioned, as an example, an MPFM may be free of a radioactive source. In such an example, the MPFM may be more amenable to handling and pose lesser risks to humans, the environment, etc. Such an MPFM may also be of lesser cost where, for example, one or more other cost reduction measures may be employed. For example, consider selection and utilization of a material of construction for one or more components that may be less costly than those utilized for a radioactive source-based MPFM. As an example, a non-radioactive source MPFM may be suitable for more widespread use and, for example, may utilize a relatively standard type of flange for coupling into a system. For example, consider utilization of a flange type specified by an ASME standard that may find common use in pipelines (e.g., flow networks, etc.).

As to an example of a radioactive source-based MPFM, consider the Vx SPECTRA surface multiphase flow meter (SLB, Houston, Texas), which may include, for example, an ANSI flange, a GRAYLOC flange, a compact NORSOK flange (Norsk Sokkels Konkuranseposisjon flange). As an example, a flange type may be a compact flange (e.g., NORSOK flange as compact flange types). The term "compact flange" may signify as to flanges that they are compact in size for small diameter pipeline applications. Some examples of recognized compact flange designs may be found under the design standards of NORSOK-L005 and ISO 27509. For example, compact flanges may weigh less than conventional ANSI flanges (e.g., by 70 to 80 percent). Compact flanges have double independent seals with integrated sealing systems both inside and outside, which can allow for greater pressure and temperature ranges. As an example, a compact flange may be suitable for various pipe sizes (e.g., 1.27 cm to 122 cm) with a pressure rating of class 150 to class 2500 specifications. As an example, flanges according to the ASME B16.5 standard can include cast and forged steel pipe flanges and other pipe flanges.

As to the Vx SPECTRA MPFM, it may include a body made of a high-performance alloy such as UNS S31803 (duplex stainless steel) or UNS N06625 (INCONEL 625). UNS S31803/2205 is a duplex grade alloy with a ferritic-austenitic microstructure. This alloy consists of around 40 to 50 percent ferrite in an annealed condition. The duplex microstructure has high strength of ferritic grades while retaining corrosion resistance of austenitic grades. The UNS S31803/2205 alloy tends to exhibit superior resistance to chloride pitting and crevice corrosion as compared to 317L stainless steel. The UNS N06625 (INCONEL 625) alloy achieves reasonably high strength through presence of molybdenum and niobium to a nickel-chromium base. Due to a relatively high level of chromium and molybdenum, it tends to be corrosion resistant in various aggressive environments and may be resistant to pitting and crevice corrosion with a pitting resistance equivalent number (PREN) of over 45.

As an example, an MPFM may include flanges made of a high-performance alloy; whereas, a pipeline flange may be made of a lesser grade material. In such an approach, the flanges of an MPFM may have a specified lifetime that exceeds that of a pipeline flange made of a lesser grade material. Where leakage may occur at a joint with respect to corrosion of a pipeline flange, replacement and/or servicing of the pipeline flange may be less costly than replacement and/or servicing of an MPFM flange.

As an example, an MPFM may include flanges made of carbon steel, which may provide for manufacturing, supply and use of a lower cost MPFM, which, as mentioned, may operate with or without a radioactive source. In such an example, if mated with a carbon steel pipeline flange, corrosion potential of the flanges may be similar.

Figure 3:
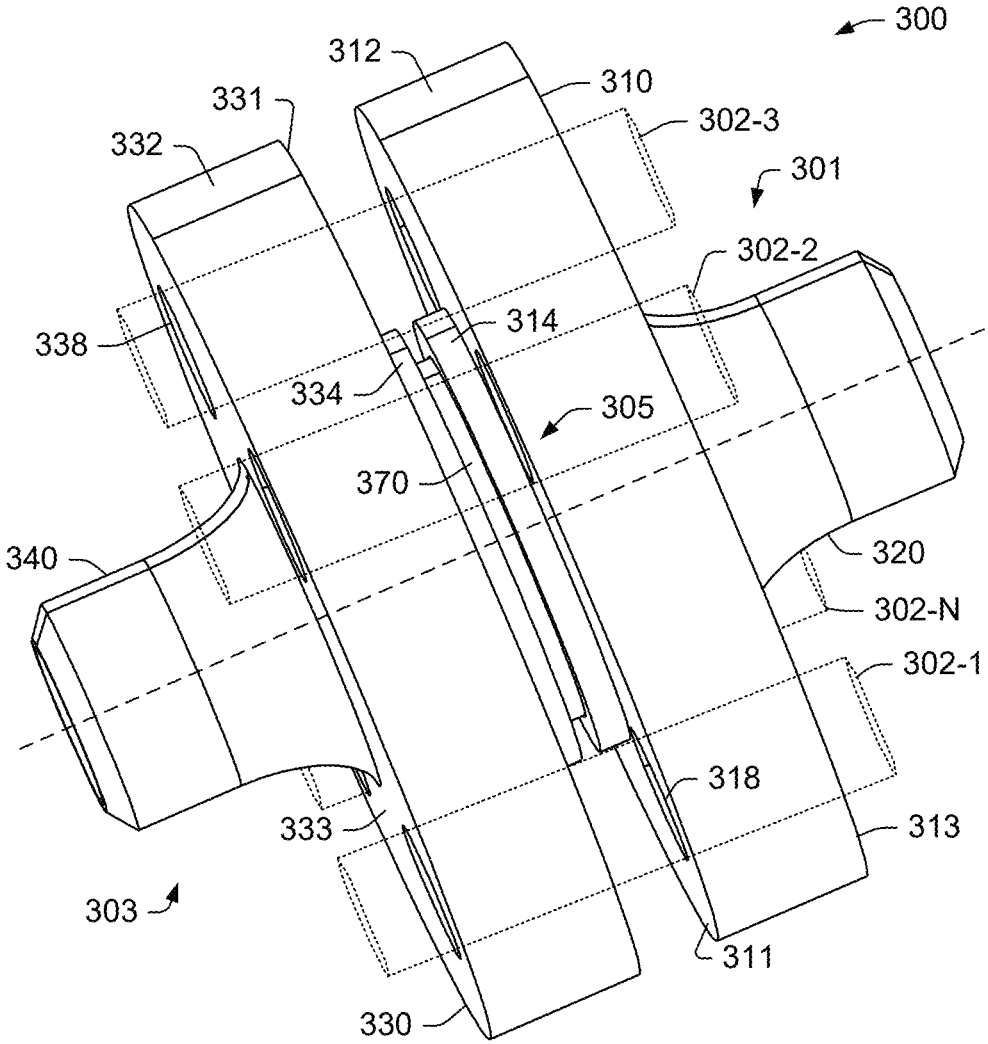
FIG. 3 illustrates an example of an assembly.

FIG. 3 shows an example of an assembly 300 that includes components 301 and 303 that are joined to form a joint 305. In such an example, a number of fasteners 302-1, 302-2, 302-3, . . . , 302-N may be utilized (see dotted lines). For example, consider a number of bolts as may be specified according to one or more standards, which may be accompanied by corresponding threads, nuts, etc. (e.g., threaded bore and bolt fasteners, nut and bolt fasteners, etc.). In the example of FIG. 3, the components 301 and 303 include bores that define a bore space for flow of fluid where the joint 305 aims to be a sealed joint such that fluid does not leak from the bore space to a space external to the assembly 300.

As shown, the component 301 includes a flange portion 310 and a conduit portion 320 where the flange portion 310 includes a joint side, substantially annular surface 311, a peripheral surface 312, and a conduit side, substantially annular surface 313.

As shown, the component 303 includes a flange portion 330 and a conduit portion 340 where the flange portion 330 includes a joint side, substantially annular surface 331, a peripheral surface 332, and a conduit side, substantially annular surface 333.

As shown, the flange portions 310 and 330 can include openings 318 and 338 that may be aligned for receipt of respective bolts that may be tightened using threads, nuts, etc., to apply pressure to the joint 305, which may help to impart a sealing force to one or more seal components that may be clamped between the components 301 and 303. As shown, the components 301 and 303 may be shaped to form the joint 305. For example, the component 301 can include an extension 314 and the component 303 can include an extension 334 that may be brought into contact with each other to form at least part of the joint 305.

As an example, the assembly 300 may include features to provide for formation of a standardized type of joint. For example, consider the ASME B16.5 standard that specifies a ring type of joint. The ASME B16.5 standard covers pressure-temperature ratings, materials, dimensions, tolerances, marking, testing, and methods of designating openings for pipe flange and flanged fittings. The ASME B16.5 standard covers steel pipe flanges and flanged fittings from nominal pipe size (NPS) ½ through NPS 24 in pressure class 150 to class 2500.

As to some examples of dimensions, consider class 150 where NPS ½ may correspond to a flange diameter of approximately 3.5 inches while NPS 24 may correspond to a flange diameter of approximately 32 inches. In such examples, a number of bolts may be specified, for example, consider 4 bolts for NPS ½ (e.g., in a bolt circle of 2.375 inches) where bolt diameter may be 0.5 inches and 20 bolts for NPS 24 (e.g., in a bolt circle of 29.5 inches) where bolt diameter may be 1.25 inches. As the class increases, flange diameter may increase and number of bolts and/or type of specified bolts may change. For example, in class 900, NPS ½ may correspond to a flange diameter of approximately 4.75 inches while NPS 24 may correspond to a flange diameter of approximately 41 inches. In such examples, a number of bolts may be specified, for example, consider 4 bolts for NPS ½ (e.g., in a bolt circle of 3.25 inches) where bolt diameter may be 0.75 inches and 20 bolts for NPS 24 (e.g., in a bolt circle of 35.5 inches) where bolt diameter may be 2.5 inches (e.g., double that for class 150).

As an example, the ASME B16.5 standard can provide specifications for flanges and flanged fittings made from cast or forged materials; blind flanges and certain reducing flanges made from cast, forged or plate materials; and flange bolting, gaskets and joints.

As to a flanged joint assembly, it may be composed of various components, which can include flanges, gasket, and bolting that may be assembled by an assembler. In general, various controls are exercised in the selection and the application of the components to attain a joint that has acceptable leak tightness. For example, one or more techniques, such as controlled bolt tightening, may be specified (see, e.g., ASME PCC-1).

As mentioned, an assembly can include a gasket, which may be referred to as a seal component, a seal ring, etc. As an example, an assembly can include a secondary heel seal adaptor suitable for utilization in an assembly that otherwise adheres to one or more specifications set forth in the ASME B16.5 standard. In such an example, the secondary heel seal adaptor may help to reduce crevice corrosion, for example, consider a reduction in time to crevice corrosion and/or kinetics of crevice corrosion at and/or near a seal ring.

As an example, a joint component may be formed of a material such as a metallic material or a polymeric material. As an example, an assembly may include one or more joint components. As an example, an assembly may include joint components where such components may be formed of a common material or of different materials. As an example, as to polymeric materials, consider one or more polymers of the polyaryletherketone (PAEK) family. For example, consider polyether ether ketone (PEEK), which is an organic thermoplastic polymer. PEEK is a semicrystalline thermoplastic with mechanical and chemical resistance properties that tend to be retained at relatively high temperatures.

Processing conditions used to mold PEEK may influence crystallinity and hence mechanical properties. As an example, a PEEK material may exhibit a Young's modulus of approximately 3.6 GPa with a tensile strength in a range, for example, of approximately 90 MPa to approximately 100 MPa.

Figure 4:
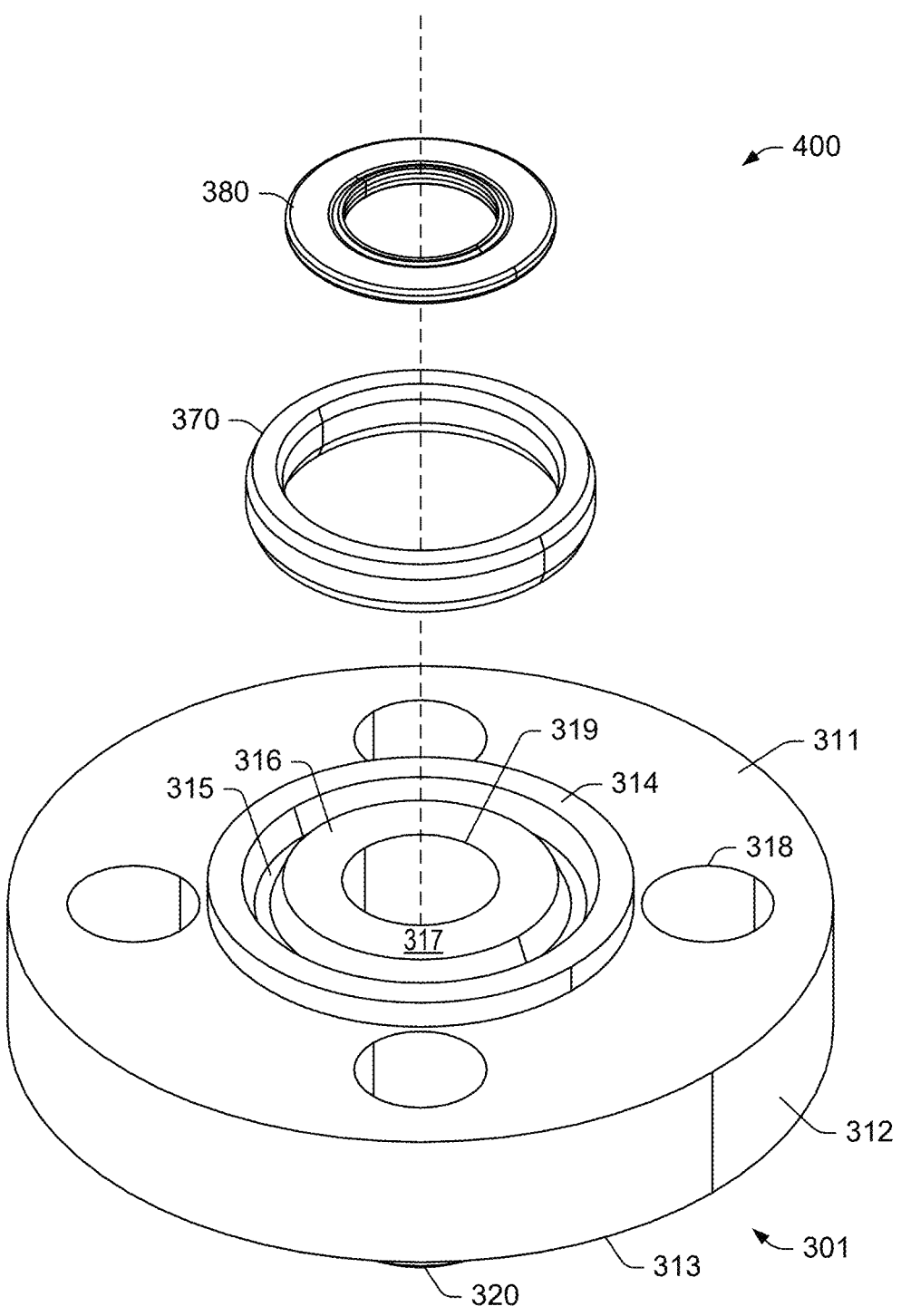
FIG. 4 illustrates an example of a portion of an assembly.

FIG. 4 shows an exploded view of an assembly 400, which may be a portion of the assembly 300. For example, consider the component 301 as including various features as described with respect to FIG. 3. As shown in FIG. 4, the component 301 can include features associated with the extension 314. For example, consider the extension 314 as being an outer extension and an extension 316 as being an inner extension where an annular recess 315 is formed between the extensions 314 and 316. As shown, the extensions 314 and 316 may be annular with a varying diameter or varying diameters such that the shape of the annular recess varies, for example, to decrease in annular width in a direction away from the joint side, substantially annular surface 311 toward the conduit side, substantially annular surface 313. In such an approach, the recess 315 may be formed by one or more sloped walls (e.g., an inner wall of the extension 314 and an outer wall of the extension 316).

As shown in the example of FIG. 4, an axial face 317 may be formed by the inner extension 316 where the axial face 317 may be defined by the recess 315 at its outer perimeter and by a bore wall 319 at its inner perimeter that defines a bore. For example, the axial face 317 may be an annular axial face that extends from the recess 315 to the bore wall 319.

As shown in the example of FIG. 4, the assembly 400 can include one or more joint components 370 and 380 (see also FIG. 3, where a portion of the joint component 370 may be visible). In the example of FIG. 4, the joint component 370 may be a primary seal component and the joint component 380 may be a secondary seal component. As shown, the joint component 370 may include a surface that may be exposed to air (e.g., an external environment) and an opposing surface that may be exposed to process fluid (e.g., an internal environment). As to the joint component 380, it may be completely internal and not exposed to an external environment; rather, the joint component 380 may be exposed to process fluid where process fluid may contact one or more surface of the joint component 380.

As shown, the joint components 370 and 380 may be substantially annular and may, for example, be referred to as rings. As an example, the joint component 380 may be referred to as a disk (e.g., with a central opening) or an annular disk. As shown, the joint component 370 has an inner perimeter that is sufficient to accommodate an outer perimeter of the outer wall extension 316. As an example, the joint component 370 may be seated at least in part in the recess 315 and the joint component 380 may be seated with respect to the axial face 317 and/or the bore wall 319.

As an example, the joint component 370 may provide for spatially locating the joint component 380. For example, a diameter of the outer perimeter of the joint component 380 may be approximately equal to a diameter of the inner perimeter of the joint component 370 such that location of the joint component 370 in the recess 315 provides for locating of the joint component 380 (e.g., centering of the joint component 380). As explained, the recess 315 may include one or more sloped walls. In such an example, the one or more sloped walls of the recess 315 may provide for stably locating and centering of the joint component 370. In contrast, as an example, the joint component 380 may not cooperate with one or more features of the component 301 for purposes of radial locating (e.g., radial centering). Hence, the joint component 370 may cooperate with the recess 315 of the component 301 for purposes of locating (e.g., centering) where the joint component 380 can leverage that locating mechanism for its own locating (e.g., radial centering).

As to axial locating of the joint component 380, one or more features may be utilized where, for example, one or more gaps may be formed. For example, a gap may be formed with respect to a surface of the joint component 380 and at least a portion of the axial face 317 of the component 301.

Figure 5:
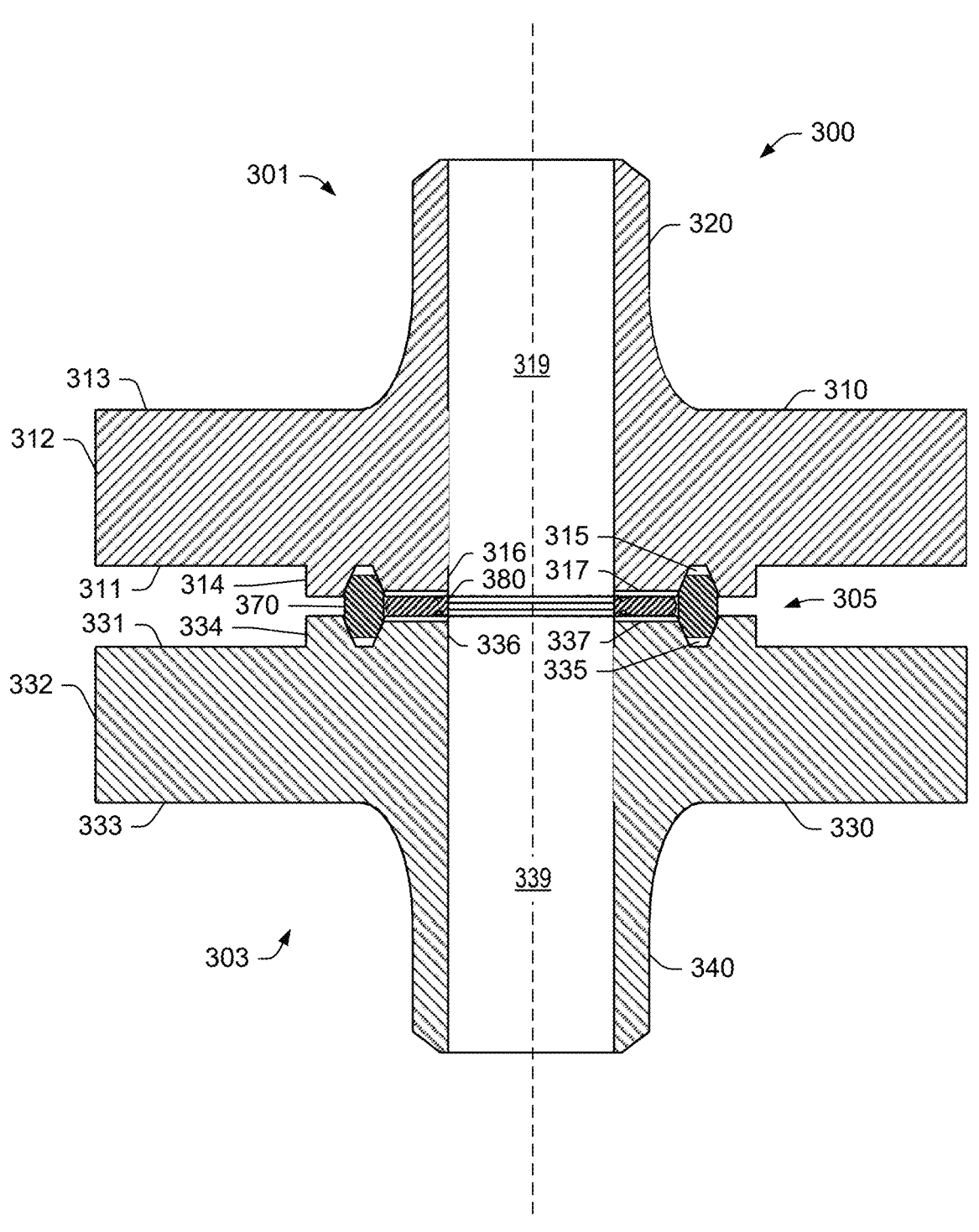
FIG. 5 illustrates an example of an assembly.

FIG. 5 shows a cross-sectional view of an example of the assembly 300. As shown in FIG. 5, the joint component 370 includes a surface that faces an external environment and that may result in spacing of the component 301 from the component 303 by a distance that may be referred to as a gap distance. As shown in the example of FIG. 3, the component 301 does not directly contact the component 303; rather, the joint component 370, as received in part in the recess 315 and in part in a recess 335, can act to space apart the component 301 from the component 303.

As to gap distance of a gap (e.g., a gap dimension of a gap), in the example of FIG. 5, consider a gap distance of approximately 0.1 mm to approximately 5 mm, which may depend on NPS, class, application, etc. As an example, where NPS increases, a gap distance may increase. For example, a gap distance may scale proportionally or otherwise with respect to NPS, which may be indicative of nominal pipe size in inches (e.g., NPS ½ is a nominal pipe size of 0.5 inches). As explained, a gap may provide for receipt of one or more components where, for example, a component may be appropriately sized for a given gap distance. As an example, a gap distance may be less than approximately 5 mm for an NPS ½ flange joint and may be less than approximately 50 mm for an NPS 24 flange joint. For example, a gap distance may be less than approximately 40 percent of a nominal pipe size, less than approximately 20 percent of a nominal pipe size, or less than approximately 10 percent of a nominal pipe size. As to an NPS ½ flange joint, which is 0.5 inches or 12.7 mm, consider, for example, 40 percent is 0.2 inches or 5.08 mm, while, as another example, consider 10 percent is 0.05 inches or 1.27 mm. As to an NPS 24 flange joint, which is 24 inches or 609.6 mm, consider, for example, 40 percent is 9.6 inches or 243.84 mm, while, as another example, consider 10 percent is 2.4 inches or 60.96 mm. As to an approximate percent, consider, for example, plus or minus 3 percent. As to an approximate dimension, consider, for example, plus or minus 10 percent.

As shown in FIG. 5, the component 303 can include an extension 336 as an inner extension where the extension 334 is an outer extension, where surfaces (e.g., walls) of the extensions 334 and 336 define the recess 335. Further, an axial face 337 may be defined between the recess 335 and the bore wall 339.

As explained, fluid may be disposed in bores defined by the bore walls 319 and 339 of the components 301 and 303 such that the joint component 370 as seated in the recesses 315 and 335 may help to seal the bore space, as an internal space, from an external space such that the fluid does not leak from the internal space to the external space. As to leakage, the assembly 300 may aim to provide for substantial sealing over some period of time, which may depend on fluid characteristics, materials of construction, dimensions, environmental conditions, presence of electromagnet fields, etc.

As to the joint component 380, it may provide for a reduction in corrosion. For example, it may help to decrease dynamics of a corrosion process (e.g., decrease corrosion kinetics, hinder a corrosion process, etc.). In such an example, the joint component 380 may help to increase lifetime of a joint and/or make a joint more robust to one or more conditions that may tend to increase dynamics of a corrosion process.

As to fluid leakage, a process referred to as crevice corrosion, under various conditions, may take place over some period of time such that a seal fails to properly hinder movement of fluid, which may result in some amount of fluid leakage. Crevice corrosion involves a localized attack on material, which may be associated with a relatively stagnant solution on a microenvironmental level. In various instances, a relatively stagnant solution in a crack or small pit may develop a relatively high pH in comparison to its surrounding environment.

Crevice corrosion pertains to corrosion occurring in one or more types of substantially occluded spaces such as, for examples, interstices in which an effectively stagnant solution may be trapped and not renewed or renewed on a long time scale. Spaces that may promote stagnation may include crevices. Examples of crevices can include gaps and contact areas between parts, under gaskets or seals, inside cracks and seams, spaces filled with deposits and under sludge piles, etc.

Various types of materials may be relatively resistant to corrosion. For example, corrosion resistance of a stainless steel may depend on presence of a thin protective oxide film on its surface, which may be referred to as a passive film. However, under certain conditions, the passive film may break down, for example, consider conditions where halide solutions and/or reducing acids may be present. Areas where a passive film may break down may depend on part or assembly geometry. For example, consider areas under gaskets, in sharp re-entrant corners or associated with incomplete weld penetration or overlapping surfaces. Such areas may be (e.g., or become) crevices that may promote corrosion.

As to stainless steel, a passive layer may be a relatively thin layer of chromium oxide which, due to the chromium reacting with oxygen in a surrounding environment. Such a passive layer may develop as a surface layer on stainless steel with a chromium content of above approximately 11 percent. A passive layer on stainless steel may shield the stainless steel from being chemically attacked and therefore subject to corroding. With a sufficient level of chromium, the chromium can combine with oxygen to form chromium oxide ($Cr_2O_3$). In various instances, an acid is utilized to treat stainless steel to promote passive layer formation (e.g., consider nitric acid, citric acid, etc.).

As explained, corrosion resistance of stainless steels can result from the presence of a thin oxide film, referred to as a passive film, which may be of a thickness in a range from approximately 0.1 mm to approximately 5 mm (e.g., consider a range from approximately 1 mm to approximately 3 mm). As to growth of a passive film, it may occur within a matter of seconds to minutes where, for example, long range film ordering may be a considerably slower process that takes several hours. Over relatively short times, charge transfer at a metal/film or a film/solution interface may limit rate of film growth on stainless steels.

Once a stainless steel component has been passivized and placed in service, its passive layer may be damaged, for example, by being abraded or through expansion or contraction caused by heating and cooling. Where a sufficient amount of oxygen is present to combine with chromium (e.g., along with other conditions), the passive layer may heal (e.g., reform); noting that various chemical reactions may also damage a passive layer and/or keep it from forming successfully or reforming.

To be a site of corrosion, a crevice may possess one or more dimensions that permit entry of a corrodent while being sufficiently narrow to result in corrodent stagnation. As an example, crevice corrosion may occur in a gap a few microns wide; whereas, if dimensions and/or design provide for circulation of corrodent, then crevice corrosion may not occur.

As an example, an assembly may be constructed using various components that may provide for reduction in crevice corrosion, for example, consider an assembly that may reduce crevice corrosion kinetics, available space, available constituents, etc.

As to issues with crevices, they may develop a local chemistry that may differ substantially from chemistry of a bulk fluid. For example, in boilers, concentration of non-volatile impurities may occur in crevices near heat-transfer surfaces because of the continuous water vaporization. A concentration process may often be referred to as "hideout" (HO), whereas, an opposite process, whereby concentrations tend to even out may be referred to as "hideout return" (HOR). In a neutral pH solution, the pH inside a crevice may drop to a pH value of approximately 2, which corresponds to a highly acidic condition that can accelerate corrosion of various metals and alloys.

For a given crevice type, factors involved in initiation of crevice corrosion can include (i) chemical composition of the electrolyte in a crevice and the (ii) electrical potential drop into a crevice. Both the drop of potential and the change in composition of the crevice electrolyte can be produced by oxygen depletion of a solution inside a crevice (e.g., consider oxygen consumption caused by metal oxidation at an inner surface of an occluded cavity) and the separation of electroactive areas, with net anodic reactions (oxidation) occurring within a crevice and net cathodic reactions (reduction) occurring at an exterior of a crevice. In various instances, a ratio of surface areas between a cathodic region and an anodic region can be relevant.

Some type of phenomena that occur within a crevice may be somewhat reminiscent of galvanic corrosion. For example, galvanic corrosion may be characterized by two connected metals in a single environment; whereas, crevice corrosion may be characterized by one metal component in two connected environments.

As explained, in crevice corrosion, factors can include geometry of a crevice and nature of a concentration process leading to development of differential local chemistry. Extreme and, at times, unexpected, local chemistry conditions inside a crevice may be taken into considered. In various instances, depending on materials present, galvanic effects may play a role in crevice degradation.

Figure 6:
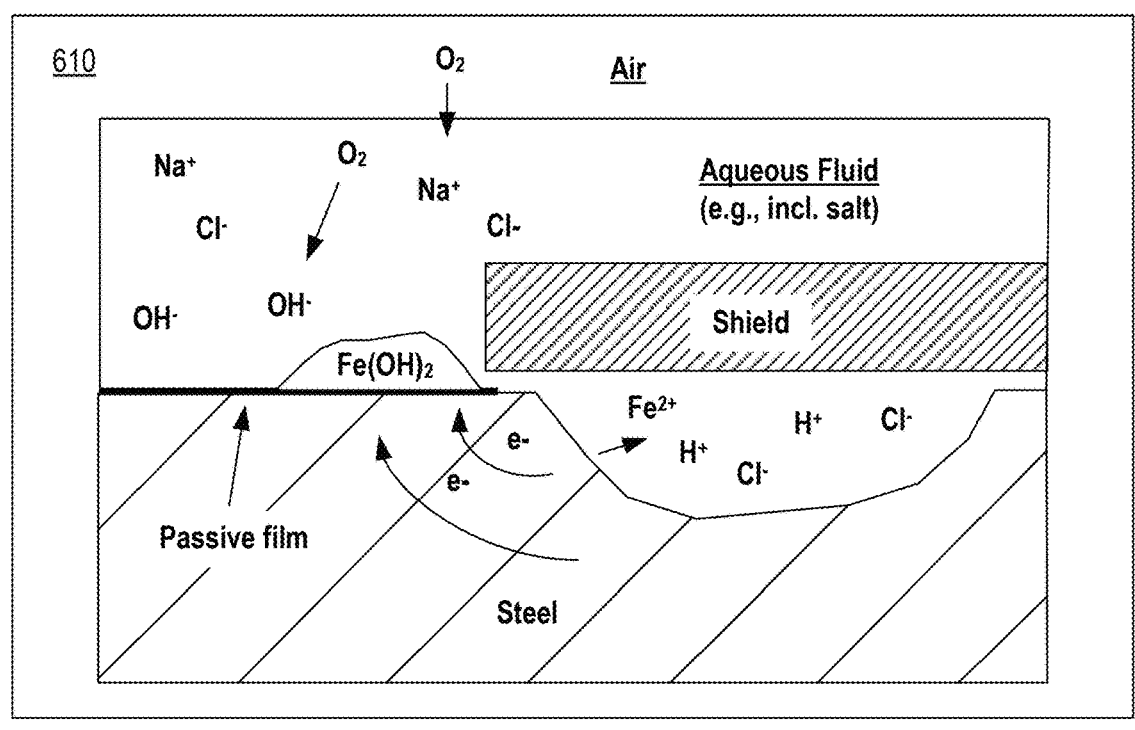
FIG. 6 illustrates examples of schematics representative of crevice corrosion kinetics.
Figure 6:
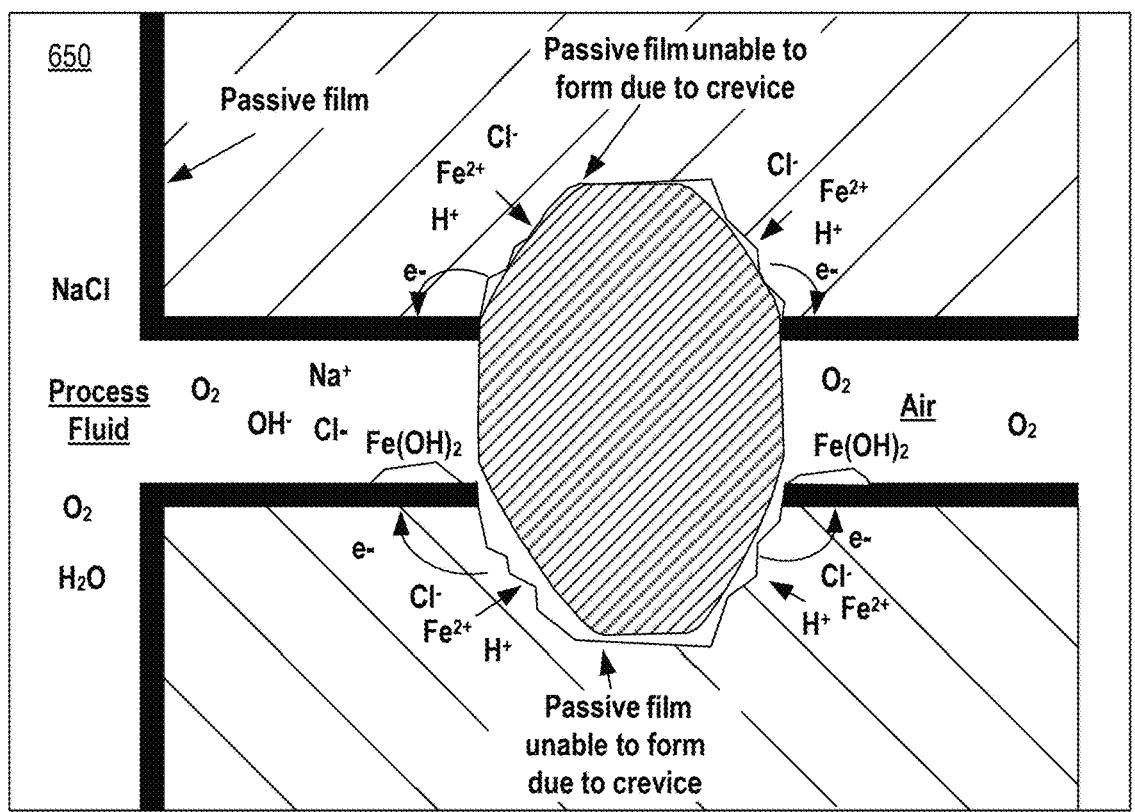

FIG. 6 shows an example schematic 610 of crevice corrosion with respect to a shield and an example schematic 650 of crevice corrosion with respect to a joint component such as a seal ring seated between two components.

In the schematic 610, a bulk aqueous fluid with salt (e.g., a saline fluid or brine) may be in contact with a steel component where a shield is positioned close to the steel component such that a crevice is formed (e.g., a relatively small gap). As shown, two local environments can be formed or, in other words, a localized detrimental environment can be formed within the crevice such that corrosion occurs of the steel component that can enlarge the crevice space to thereby increase volume of the localized detrimental environment. As shown in the schematic 610, the aqueous fluid can be in contact with air and/or another source of oxygen such that oxygen can enter the aqueous fluid.

Chemically, water ($H_2O$) may disassociate into hydroxide ions ($OH^-$) and hydrogen ions ($H^+$). As the steel component includes iron (Fe), which may lose electrons to form iron ions (e.g., $Fe^{2+}$), lost electrons (e.g., current) may flow to an unshielded portion of the steel component that is exposed to the bulk aqueous fluid. Further, some of the iron ions may migrate from a crevice to an adjacent region where such iron ions may combine with hydroxide ions to form iron oxide (e.g., consider one or more types of iron oxide). As shown in the example of FIG. 6, the iron oxide $Fe(OH)_2$ may be formed.

As explained, a passive film may protect a metallic component with respect to a bulk aqueous fluid; whereas, a localized crevice environment may be detrimental to a passive film such that a passive film degrades and/or does not form or reform. For example, as shown in the schematic 610, the localized crevice environment may become enriched with hydrogen ions ($H^+$), noting that hydrochloric acid has the formula HCl. As shown, given chloride ions ($Cl^-$) in the bulk aqueous environment, these may migrate to the localized crevice environment such that hydrochloric acid (e.g., as may be disassociated) exists. Such an environment can be characterized by a relatively low pH value (e.g., consider approximately 2 or less). The pKa value of hydrochloric acid in aqueous solution is estimated theoretically to be −5.9. A solution of hydrogen chloride in water behaves as a strong acid where the concentration of HCl molecules is effectively zero (e.g., $H^+$ and $Cl^-$ are disassociated).

In the schematic 650, a joint is formed by three components, which include two components with a joint component disposed therebetween. For example, consider the two components as being flange components with a seal ring disposed in recesses of the flange components. In such an example, the seal ring can be a divider that divides a process fluid environment from an external gas environment (e.g., consider air environment and/or other gas environment that may include oxygen).

The schematic 650 demonstrates how recess walls of the two components may degrade due to crevice corrosion. As the recess walls provide mating surfaces for the joint component, degradation of those mating surfaces can reduce contact area between the components and thereby form routes for process fluid to leak from the process fluid environment to the external gas environment. As shown, in the corroded regions, passive film formation may be hindered such that the recess walls are relatively unprotected and subject to crevice corrosion.

As explained, crevice corrosion can be a type of localized corrosion that take place in one or more areas where fluid may be stagnant (e.g., consider holes, joints, gaskets, deposits, touching surfaces and loose corrosion products (e.g., from upstream)). A crevice that is wide enough to permit liquid entry and sufficiently narrow to maintain a stagnant zone may cause crevice corrosion. As to narrowness, consider, for example, a dimension such as a few millimeters or less (e.g., consider a crevice dimension that may be less than 3 mm). As an example, a region may be initially narrow or become narrow due to one or more phenomena (e.g., creep, temperature induced expansion, debris, etc.). In such an example, the region may effectively become a crevice.

Oxygen may become exhausted in a crevice due to anodic reaction and limited mass transfer, leading to an oxygen concentration gradient. Corrosion may then be supported by an external cathodic reaction where it is rich in oxygen. Cations accumulated in the crevice tend to migrate out while anions tend to migrate in, for example, to maintain charge neutrality. The hydration of cations (e.g., $Fe^{2+}$ and $Fe^{3+}$) may further reduces pH in a crevice. Inflow of aggressive anions, especially chloride (Cl) may cause pH to fall further; noting that chloride tends to be prevalent in the context of hydrocarbon production (e.g., petroleum, natural gas, etc.). In various instances, pH may proceed to drop further while chloride ions increase in concentration until a localized solution is aggressive enough to penetrate a passive film. Upon breaching of a passive film, corrosion may occur relatively rapidly.

Crevice corrosion may be described as being autocatalytic, which may involve a cyclic process of: pH decreases, corrosion rate at crevice wall increases, influx of chlorides increases, and concentration of chlorides increases.

As an example, consider a process that may occur as follows: (1) when oxygen supply in a crevice becomes depleted, a potential arises that drives corrosion in the crevice such that $Fe \rightarrow Fe^{2+}+2e^-$; (2) to maintain charge neutrality, $Fe^{2+}$ will migrate out of the crevice and aggressive anions like $Cl^-$ will tend to enter the crevice[1,2] where these aggressive $Cl^-$ will lower pH further by forming insoluble metal hydroxide and HCl accordingly $Fe^{2+}+2Cl^-+H_2O \rightarrow Fe(OH)_2+2HCl$, noting that the hydrogen chloride reaction, $Fe^{2+}+2Cl^-+H_2O \rightarrow Fe(OH)_2+2HCl$, mentioned here is the precipitation of insoluble $Fe(OH)_2$ and soluble HCl(aq); (3) hydration of $Fe^{2+}$ also lowers pH accordingly $Fe^{2+}+H_2O \rightarrow Fe(OH)^++H^+$; and (4) pH continues to fall and the concentration of Cl continues to increase until the solution is aggressive enough to breach the passive film (NB passivation depends on potential and pH) which results an increase in corrosion.

As to aggressive $Cl^-$ entering a crevice, there may be a tendency for $Cl^-$ migration will be via one or more of the following mechanisms: diffusion (e.g., movement of species down a concentration gradient); migration (e.g., movement of charged species via a potential gradient); and convection (e.g., mechanical movement due to a thermal gradient). In various instances, chloride anions, $Cl^-$, may be contributed by dissociation of salts that exist in oil production fluid. For example, consider naturally occurring (e.g., in formation water) and/or from injected water (e.g., via one or more water injection wells). Some examples of salt species dissociation may include, but not be necessarily limited to: $NaCl(s) \leftrightarrows Na^+(aq)+Cl^-(aq)$ and $KCl(s) \leftrightarrows K^+(aq)+Cl^-(aq)$. In various instances, a dissociation process can involve chloride in a neutral and a solid phase (e.g., NaCl(s) and/or KCl(s)), being broken into soluble cations (e.g., $Na^+(aq)$ and/or $K^+(aq)$) and soluble chloride anions, Cl (aq).

For various corrosion resistant alloys, a passive film (e.g., chromium oxide film for stainless steel) may prevent corrosion from occurring. However, the presence of one or more crevices may lead to crevice corrosion, and lowering of pH such that an aggressive chloride solution forms that hinders repassivation (e.g., reformation of a protective passive film). As explained, corrosion may occur relatively rapidly at an exposed metallic surface, which, for example, in the case of an RTJ flange, can result in fluid leakage. For an NCF, fluid leakage may not occur as an NCF joint consist of a bore/heel seal that prevents fluid contact with a seal ring.

In various instances, components that form a flange may be made of dissimilar metallic materials. For example, consider a flowmeter body being made of a high-performance alloy (e.g., duplex, INCONEL, etc.), a seal ring being made of a high-performance alloy (e.g., duplex, INCONEL, etc.) or carbon steel, and a pipeline mating flange connection being made of carbon steel, a high-performance alloy, or a combination of both (e.g., consider a high-performance alloy coating on carbon steel).

As an example, an assembly can include components that are shaped, sized, and arranged to hinder crevice corrosion in a joint. As an example, such an assembly may utilize a galvanic mechanism or not. For example, consider usage of a galvanic anode that may act as a sacrificial element to reduce corrosion (e.g., on one or more sealing surfaces). A galvanic anode can be formed by a metallic alloy with a more negative electrochemical potential relative to the metallic material it aims to protect. Some examples of galvanic anode used to protect carbon steel pipelines include magnesium, zinc and aluminum.

As an example, an assembly can include a joint component that operates as a secondary heel seal adaptor. In such an example, the joint component may form a line seal where high stress concentration may be generated around a component (e.g., a flange or flanges) to achieve a mechanical seal. As to galvanic anode material such as, for example, zinc and magnesium tend to be unsuitable for accepting high mechanical loads due to their inherent low mechanical strength properties. Hence, a joint component may be made of a material other than pure zinc or pure magnesium. As to use of aluminum as a galvanic anode, aluminum tends to be challenging to use in piping due to its low fatigue limit as compared to carbon steel. Usage of materials with a low fatigue limit may cause a material to fail and rupture over cycles of mechanical load (e.g., due to mechanical forces directly, due to thermal effects, etc.), which may pose one or more types of detrimental issues to equipment, environment, people, etc., downstream of a joint in a pipeline. As materials suitable for galvanic anodes tend to be problematic with respect to their ability to handle mechanical loads (e.g., individual, cyclical, etc.), one or more other materials may be selected and utilized to create a mechanical seal for a joint formed between components (e.g., flanges).

Figure 7:
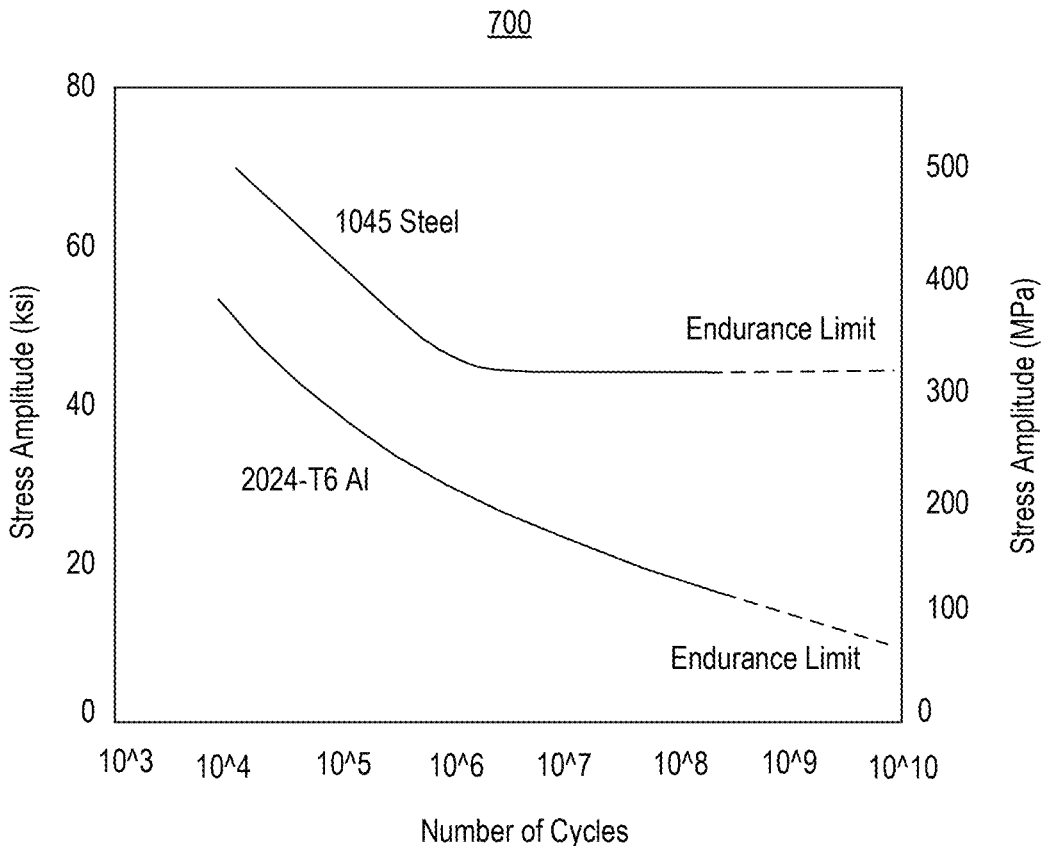
FIG. 7 illustrates an example of a plot.

FIG. 7 shows an example of a plot 700 of stress amplitude versus number of cycles for 1045 steel and 2024-T6-Al (aluminum). As explained, aluminum may have unacceptable fatigue behavior. An article by Samathan et al., "A Study on Improvement of Fatigue Life of materials by Surface Coatings", International Journal of Current Engineering and Technology Volume 8 No. 1 (2017), is incorporated by reference herein.

As explained, an assembly can include a primary joint component and a secondary joint component that can be utilized to form a joint between two components such as flanges. In such an approach, the primary joint component may be a standard component while the secondary joint component may be specially shaped and sized to perform as a secondary heel seal adaptor to hinder corrosion such as, for example, crevice corrosion.

As explained, an ASME ring type joint (RTJ) flange may be commonly used as a flange connection joint in process piping applications. As explained, an MPFM may be a non-radioactive MPFM (e.g., consider the Vx WAVE MPFM, SLB, Houston, Texas). An example of a non-radioactive MPFM is described in U.S. Pat. No. 11,835,371 B2, which is incorporated by reference herein, which may utilize an ASME RTJ flange to be coupled to a conduit (e.g., pipeline). In comparison with the radioactive Vx SPECTRA MPFM, which may utilize a compact flange (e.g., consider the NORSOK/ISO 27509 compact flange (NCF)), the ASME RTJ flange tends to be more prone to crevice corrosion. As explained, a compact flange may, for one or more reasons, be more costly than an ASME RTJ flange. As to differences between an NCF and an ASME RTJ flange, consider that the NCF utilizes a wedge design that creates a bore/heel seal that restricts the fluid to be in contact with the seal ring.

While various examples refer to utilization of a particular type of flange or flange joint as to an MPFM, such a flange or flange joint may be utilized for one or more other types of equipment, which may utilize a ring type joint (RTJ) flange design.

Figure 8:
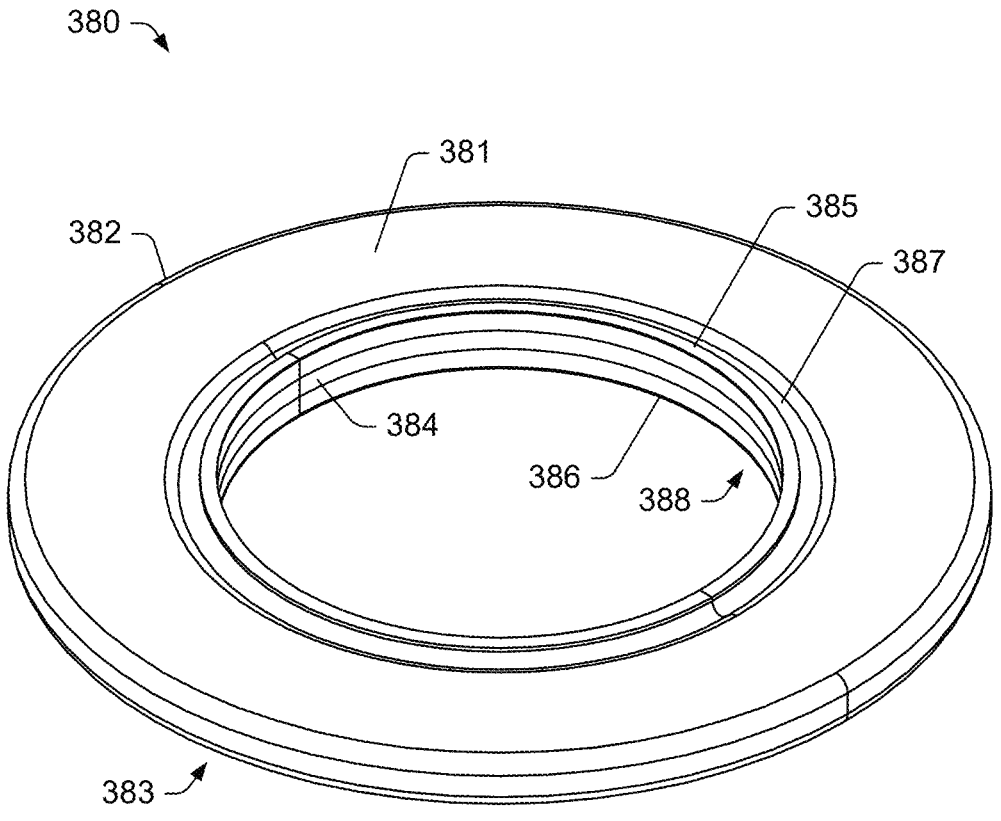
FIG. 8 illustrates an example of a joint component.

FIG. 8 shows a perspective view of an example of the joint component 380, which may, for example, be a secondary heel seal adaptor. As shown, the joint component 380 can opposing surfaces 381 and 383 that meet at an outer perimeter 382 and an inner perimeter 384. As shown, the surface 381 may extend from the outer perimeter 382, which may be radiused or otherwise smoothly contoured, to a raised lip 385 at the inner perimeter 384, where an annular recess 387 may be disposed in the surface 381 at a radial position between the raised lip 385 and the outer perimeter 382. Similarly, the surface 383 may extend from the outer perimeter 382, which may be radiused or otherwise smoothly contoured, to a raised lip 386 at the inner perimeter 384, where an annular recess 388 may be disposed in the surface 383 at a radial position between the raised lip 386 and the outer perimeter 382.

As to thickness of the joint component 380, it may vary. For example, consider a distance between the raised lips 385 and 386 as being slightly greater than a distance between the surfaces 381 and 383 at radii greater than the radius of the annular recesses 387 and 388. In such an example, upon inserting the joint component 380 between two flange components, the joint component 380 may be clamped at the raised lips 385 and 386 while providing a gap along the surface 381 and one of the two flange components and another gap along the surface 383 and the other one of the two flange components. In such an example, a clamping force (e.g., via bolts, etc.) may result in formation of a seal such that the inner perimeter 384 of the joint component 380 is substantially even and contiguous with bore walls of the two flange components. The seal formed by the joint component 380 at its inner perimeter 384 with the two flange components may be referred to as a secondary seal; whereas, the joint component 370 may form a primary seal with respect to the two flange components.

As explained, a joint component (see, e.g., the joint component 380) may operate as a secondary heel seal adaptor that acts as a secondary seal to restrict fluid circulation between a process fluid and an ASME RTJ seal ring (see, e.g., the joint component 370). In such an example, the secondary heel seal adaptor may be in a form of a disk disposed between two flanges. As an example, a non-metallic material or a metallic material may be used for a joint component that operates as a secondary heel seal adaptor. In various instances, use of a metallic material may result in a higher load, which might demand a higher bolt load to maintain flange joint integrity. To address bolt load, a load analysis may be performed, for example, consider a finite element analysis (FEA) that may provide for estimating loads and stress. Such an approach may provide for shaping and sizing a metallic joint component to assure that bolt load is within a suitable range. As an example, use of a non-metallic material may result in a lower bolt load (e.g., loading due to the presence of a secondary heel seal adaptor); however, integrity may be lesser than that of a metallic material. As an example, a material, whether metallic or non-metallic, may be selected and sized and/or shape to provide for sufficient strength and fatigue endurance to create a reliable secondary seal throughout a desired joint lifespan.

Figure 9:
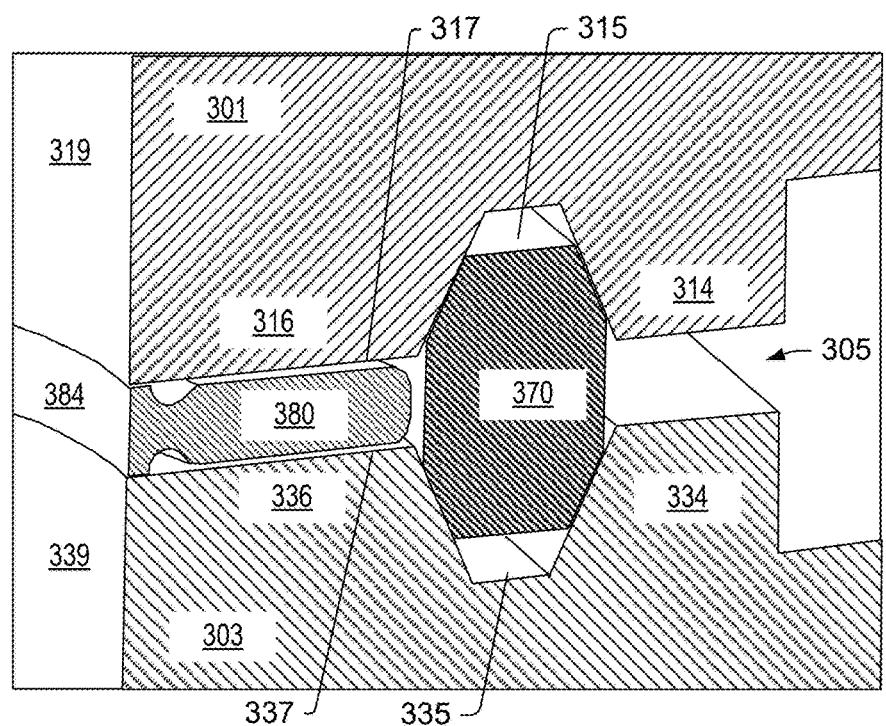
FIG. 9 illustrates an example of a portion of an assembly.
Figure 9:
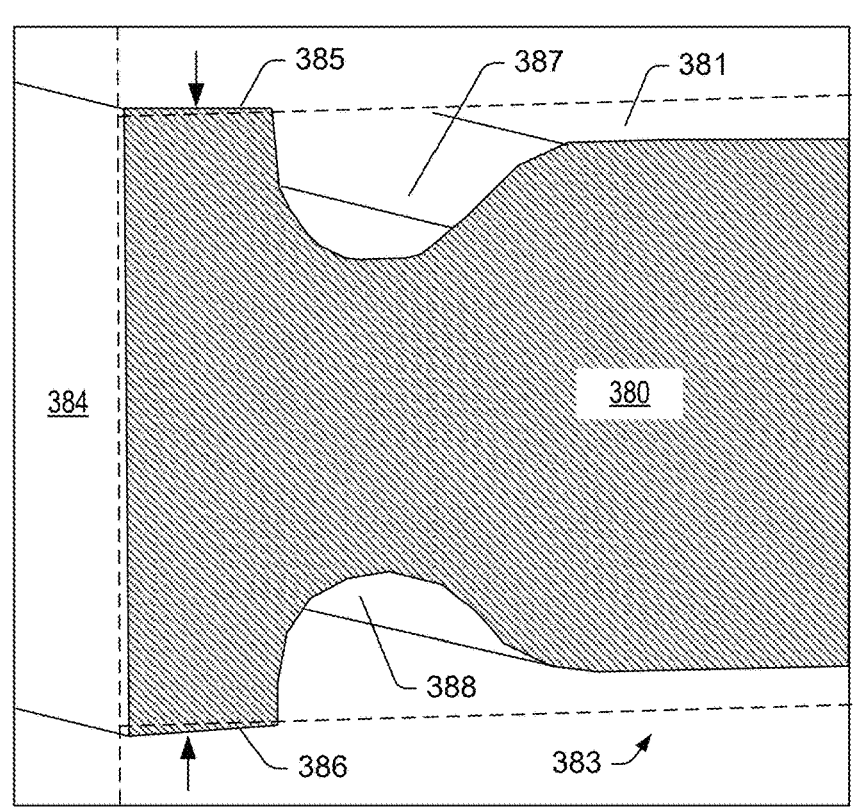

FIG. 9 shows a cutaway view of a portion of the assembly 300 where the joint component 380 is positioned with its inner perimeter 384 substantially even with bore walls 319 and 339 of the components 301 and 303 that form the bores, respectively. In an enlarged cutaway view, a portion of the joint component 380 is shown, along with its surfaces 381 and 383, raised lips 385 and 386, and annular recesses 387 and 388. In the enlarged cutaway view, dashed lines indicate portions of the components 301 and 303 that may be utilized to clamp and secure the joint component 380, particularly at the raised lips 385 and 386. In such an approach, a clamping force (e.g., a bolt load) as indicated by arrows may be applied to the raised lips 385 and 386 to cause some amount of deformation of the joint component 380 as may be accommodated at least in part by the annular recesses 387 and 388. In such an approach, the inner perimeter 384 of the joint component 380 may become slightly smaller as the raised lips 385 and 386 are compressed such that the inner perimeter 384 aligns substantially with bore walls of the components 301 and 303. In such an approach, fluid flow past the joint 305 may be less disturbed or disrupted compared to an assembly without the joint component 380.

As explained, the joint component 370 may be a primary seal component that may be clamped between the components 301 and 303 where a large percentage of a bolt load (e.g., a clamping force) is due to the presence of the joint component 370 and its function as a primary seal.

As to the impact of the joint component 370 on crevice corrosion, firstly, by forming a seal at its raised lips 385 and 386, it may hinder movement of fluid radially outwardly toward the joint component 380. Secondly, it may provide for surfaces where crevice corrosion may occur prior to crevice corrosion at the surfaces associated with the joint component 370. For example, with a secondary heel seal adaptor, crevice corrosion may be more likely to occur at the interface between the secondary heel seal adaptor and one or both mating flanges. In such an approach, the joint component 380 may create a sacrificial corrosion zone that is located radially inwardly from the joint component 370. Such an approach may thereby decrease likelihood of, delay timing of, and/or decrease severity of crevice corrosion at the joint component 370, which may function as a primary seal ring (e.g., according to an RTJ standard, etc.).

As an example, a secondary heel seal adaptor may be a separate component to be secured in a joint by clamping between two components (e.g., flanges) or, for example, may be secured to one flange. For example, consider a secondary heel seal adaptor being fixed on an MPFM venturi spool flange surface via bolts, screws, interference fit, etc. As an example, a position of a joint component may be facilitated using one or more locating features.

As shown in FIG. 9, the joint component 380 may have a geometry that provides for establishing a line type seal at or close to a bore diameter of a flange. Such an approach may be compatible with the 1.5-inch ASME B16.5 CL1500 (3000 psig design pressure) RTJ flange specifications.

As an example, an assembly can include a metallic equipment flange (see, e.g., the component 301) that includes an axially extending bore wall (see, e.g., the bore wall 319), a seal recess disposed at a radial distance from the axially extending bore wall (see, e.g., the recess 315), and a radially extending surface between the axially extending bore wall and the seal recess (see, e.g., the surface or axial face 317); a metallic pipe flange (see, e.g., the component 303) that includes an axially extending bore wall (see, e.g., the bore wall 339), a seal recess disposed at a radial distance from the axially extending bore wall (see, e.g., the recess 335), and a radially extending surface between the axially extending bore wall and the seal recess (see, e.g., the surface or axial face 337); a metallic joint component (see, e.g., the joint component 370) seated in part in each of the seal recesses to form a primary seal and to create an axial gap between the radially extending surfaces with a gap dimension; and a disk-shaped joint component (see, e.g., the joint component 380) seated radially inwardly from the metallic joint component, where the disk-shaped joint component includes axially extending lips at an inner perimeter (see, e.g., the raised lips 385 and 386 at the inner perimeter 384) that contact the radially extending surfaces to form a secondary seal therebetween, and where the disk-shaped joint component includes a disk portion that extends radially outwardly from the axially extending lips with a disk portion axial dimension that is less than an axial dimension of the axially extending lips and less than the gap dimension.

Figure 10:
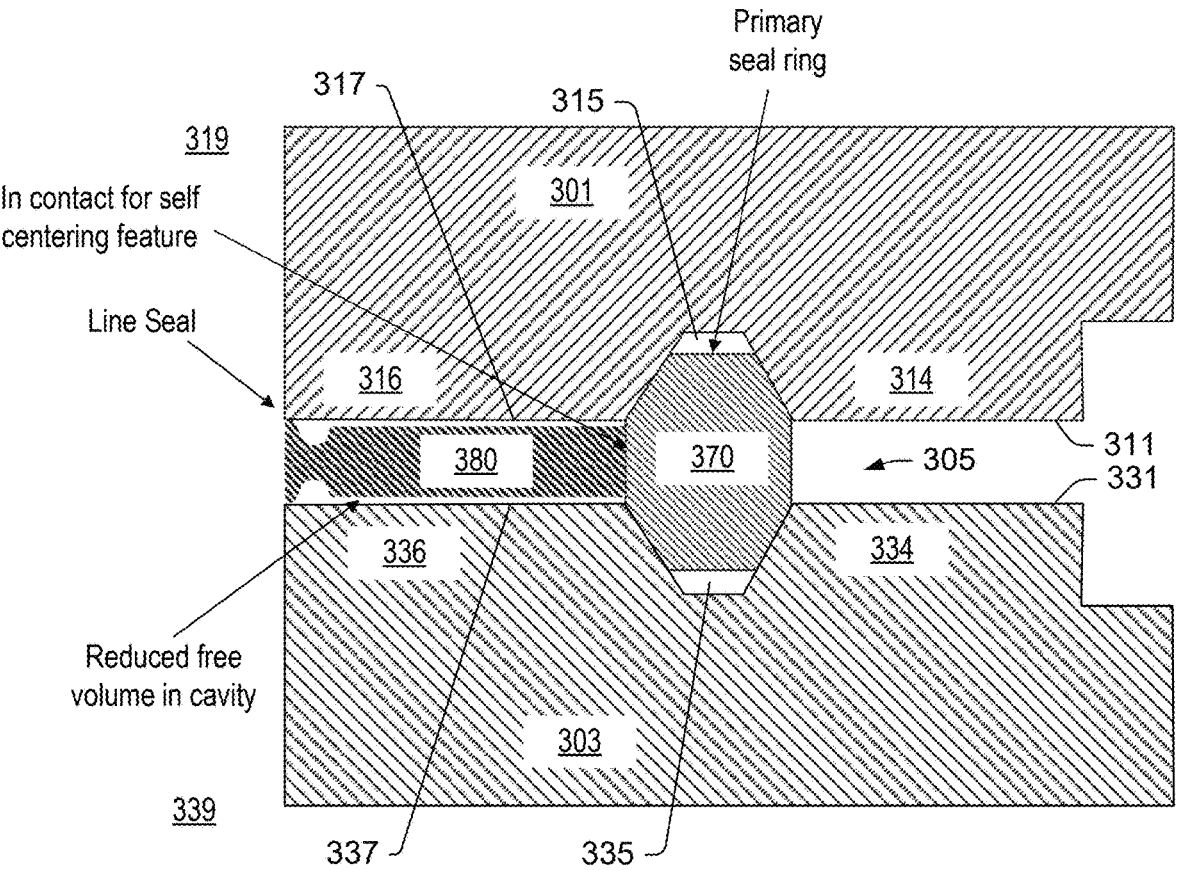
FIG. 10 illustrates an example of a portion of an assembly.

FIG. 10 shows an example of the assembly 300 where the outer perimeter 382 of the joint component 380 may be sized to seat against an inner perimeter of the joint component 370. In such an example, the joint component 370 may be seated in one of the recesses 315 and 335 and then the joint component 380 introduced to seat against the joint component 370. In such an approach, the joint component 370 and the recesses 315 and 335 may provide for centering of the joint component 380 such that, for example, the inner perimeter 384 of the joint component 380 aligns substantially with the bore walls of mating flange components 301 and 303.

Figure 11:
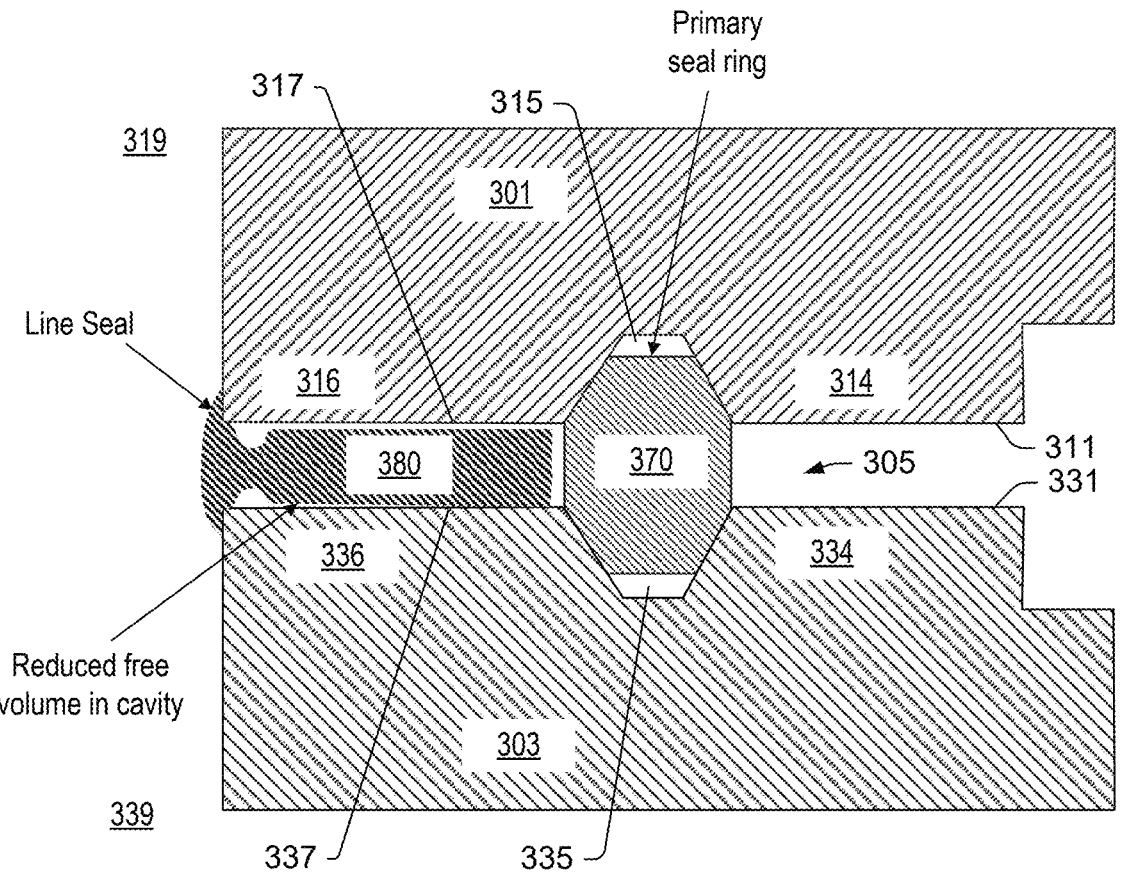
FIG. 11 illustrates an example of a portion of an assembly.

FIG. 11 shows an example of the assembly 300 where the joint component 380 may be of a smaller radius at its inner perimeter 384 and shaped with raised lips 385 and 386 that contact bore walls of the flange components 301 and 303. In such an example, a thickness between the raised lips 385 and 386 may exceed a gap dimension; noting that the raised lips 385 and 386 may include shoulder regions that provide clamping surfaces or contact surfaces that contact the axial faces 317 and 337 of the flange components 301 and 303. In the example of FIG. 11, the joint component 380 may provide for sealing along a greater surface area. As an example, the inner perimeter 384 of the joint component 380 may be shaped in a contoured manner, which may help to reduce disruption and/or disturbance to fluid flow in the bores defined by the bore walls 319 and 339.

Figure 12:
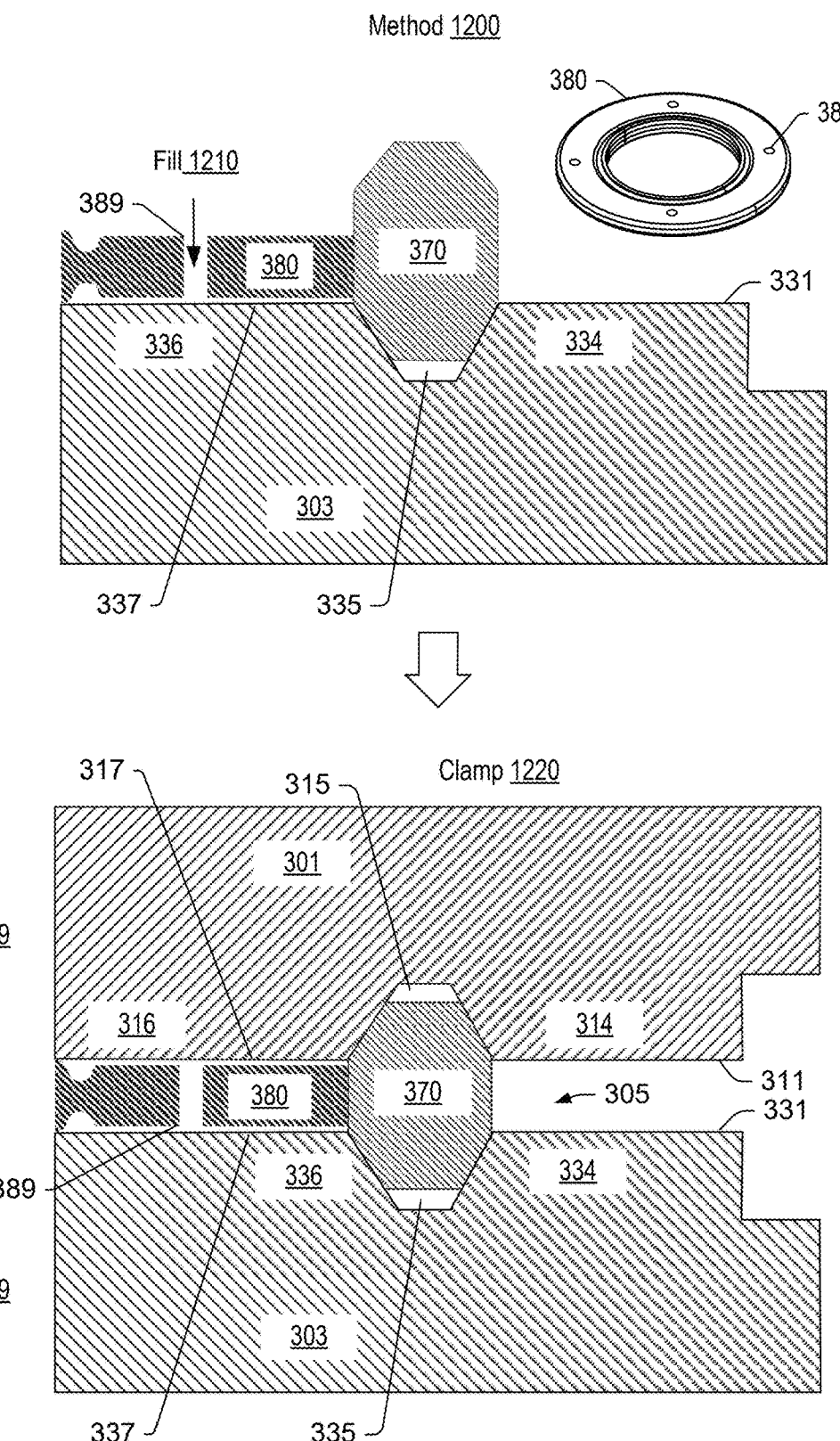
FIG. 12 illustrates an example of a method with respect to an example of a portion of an assembly.

FIG. 12 shows an example of a method 1200 with respect to an example of the assembly 300 where the joint component 380 may include one or more fluid passages 389. As shown, the method 1200 can include filling 1210, where such filling introduces a fluid via the one or more fluid passages 389 into a space, and can include clamping 1220, where such clamping clamps two flange components together where the fluid is trapped within one or more spaces. In such an example, the fluid may be selected to be a relatively inert and/or otherwise protective fluid that may hinder crevice corrosion and/or one or more other types of corrosion. As explained, the presence of the joint component 380 itself may act to reduce volume of a space that may receive fluid, which, in turn, may reduce crevice corrosion dynamics and/or demand for an amount of protective fluid (e.g., natural oil, synthetic oil, gel, grease, etc.).

Figure 13:
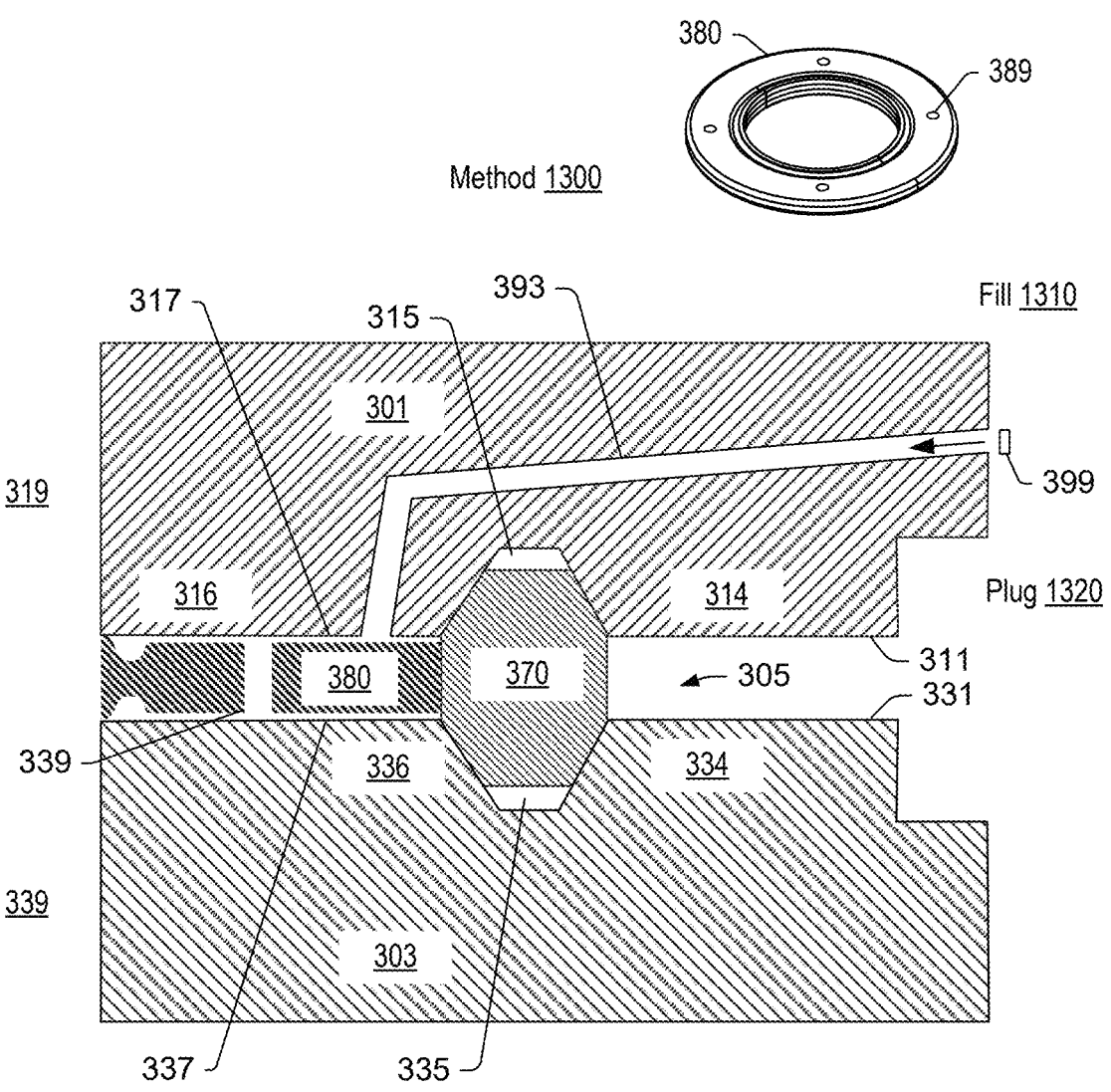
FIG. 13 illustrates an example of a method with respect to an example of a portion of an assembly.

FIG. 13 shows an example of a method 1300 with respect to an example of the assembly 300 where the component 301 and/or the component 303 may include a fluid passage 393

(e.g., or fluid passages) that may be sealed using a cap 399 (e.g., or caps) and, for example, where the joint component 380 may include one or more fluid passages 389. As an example, if both components 301 and 303 include a respective fluid passage, then the joint component 380 may or may not include one or more fluid passages. As an example, where the joint component 380 has an outer perimeter that is less than an inner perimeter of the joint component 370, then a gap may exist between the joint components 370 and 380 such that fluid may flow from one side of the joint component 380 to the opposing side of the joint component 380. In such an example, the joint component 380 may or may not include one or more fluid passages such as, for example, the one or more fluid passages 389.

As shown, the method 1300 can include filling 1310, where such filling introduces a fluid via the fluid passage 393 into a space, and can include plugging 1320, where an external opening of the fluid passage 393 may be plugged by the cap 399. In such an example, the components 301 and 303 may be clamped flange components as may be clamped using bolts, etc. Upon plugging of the external opening of the fluid passage 393, fluid (e.g., protective fluid) may be trapped within one or more spaces. In such an example, the fluid may be selected to be a relatively inert and/or otherwise protective fluid that may hinder crevice corrosion and/or one or more other types of corrosion. As explained, the presence of the joint component 380 itself may act to reduce volume of a space that may receive fluid, which, in turn, may reduce crevice corrosion dynamics and/or demand for an amount of protective fluid (e.g., natural oil, synthetic oil, gel, grease, etc.).

As an example, the fluid passage 393 may be formed by drilling a first portion from an outer perimeter of a flange component and by drilling a second portion from a joint side surface of the flange component where the two portions meet to form a contiguous fluid passage (e.g., from a joint space to an external space).

Figure 14:
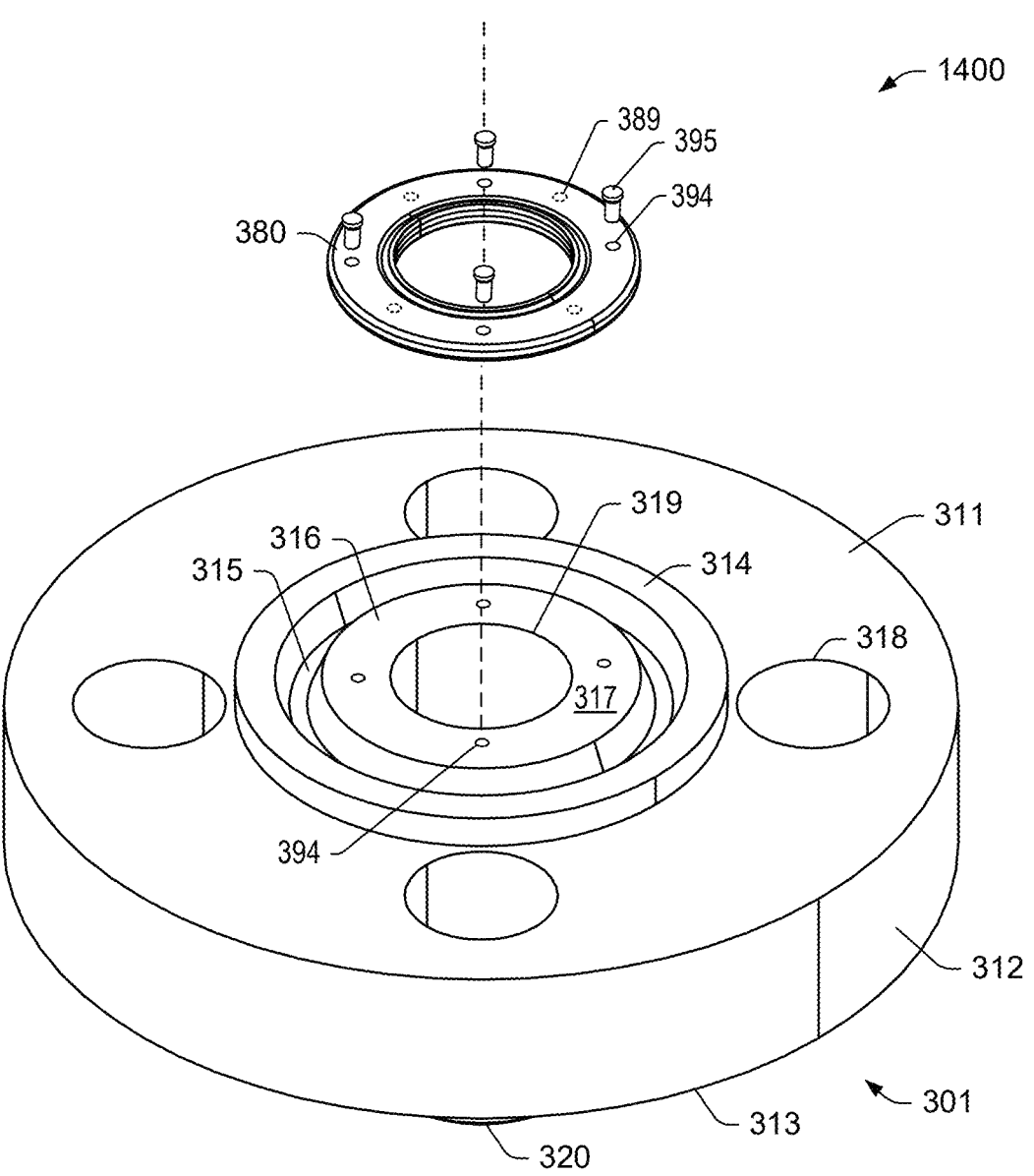
FIG. 14 illustrates an example of a portion of an assembly.

FIG. 14 shows an example of an assembly 1400 where the joint component 380 can include one or more bolt bores 394 where each may receive a respective bolt 395 that may be secured via one or more bolt bores 394 in the axial face 317 of the component 301. In such an approach, the joint component 380 may be appropriately located via one or more bolts (e.g., threaded bolts, interference fit bolts, screws, etc.) to the component 301 prior to mating the component 301 with another component (e.g., consider mating flanges). In such an approach, one or more quality control measures may be employed prior to mating to form a joint (e.g., a flange joint). As shown, the joint component 380 may or may not include one or more fluid passages 389 (e.g., for protective fluid); noting that the inner perimeter 384 of the joint component 380 forms a fluid passage for a process fluid as may flow via the bore defined by the bore wall 319 of the component 301.

As an example, a bolt may be utilized to create a compression force that activates a seal between a bottom flange and a joint component. As an example, one or more bolts may be utilized where, for example, multiple bolts, if utilized, may be received by one or more bolt bores, which may be evenly spaced. As an example, a joint component may include a number of bolt bores and/or fluid passages where, for example, a bolt bore may function as a fluid passage prior to receipt of a bolt and/or where it does not receive a bolt. As an example, a bore may be provided that may be threaded with threads for mating to a bolt or another suitable type of fastener.

As explained, a protective fluid may be a type of oil, which may be relatively viscous but sufficiently flowable to fill a crevice space or spaces as may be formed between a joint component and a surface of a flange component. As an example, a protective fluid may be trapped in one or more crevice spaces upon mating of two flange components, upon plugging one or more fluid passages, etc.

Figure 15:
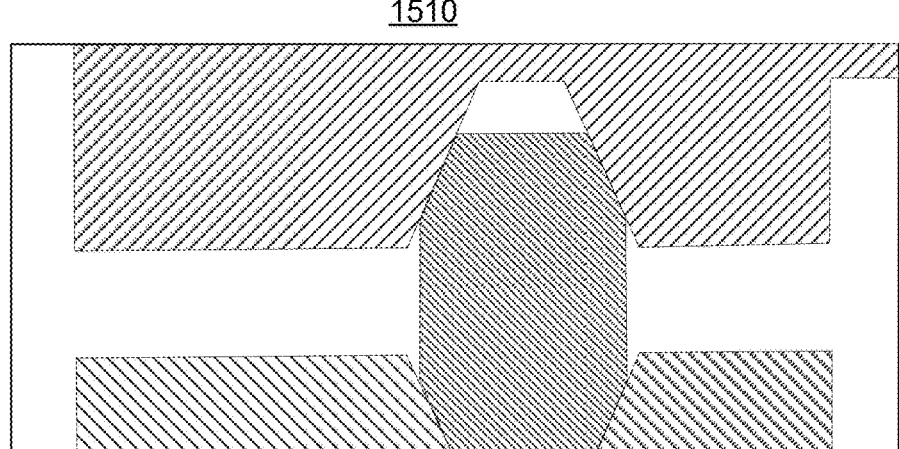
FIG. 15 illustrates example graphics of finite element analysis results.
Figure 15:
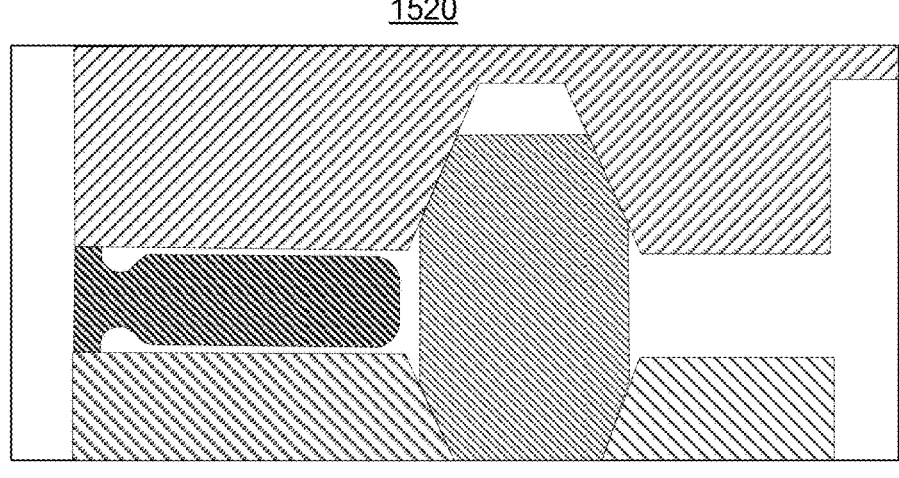
Figure 15:
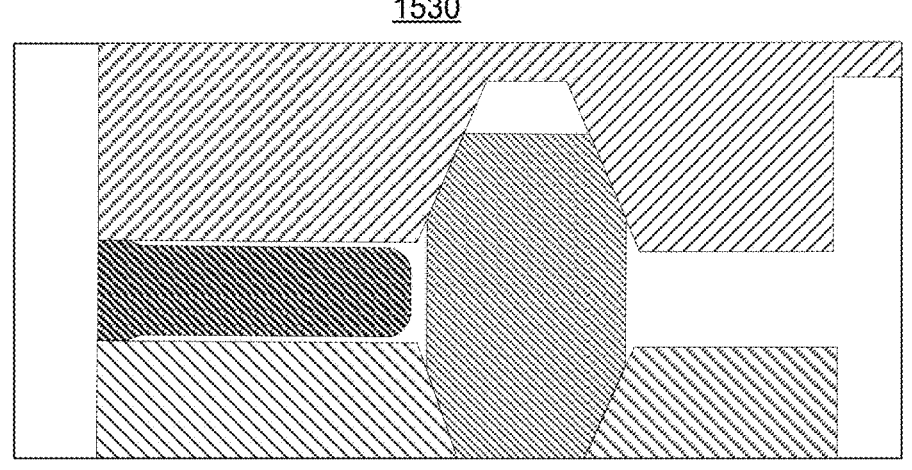

FIG. 15 shows examples of FEA models 1510, 1520, and 1530 for various assemblies that include flange components such as the flange components 301 and 303 along with one or more joint components such as one or more of the joint components 370 and 380. The FEA model 1510 correspond to an assembly with a single joint component that provides a primary seal. The FEA model 1520 correspond to an assembly with two joint component that provide a primary seal and a secondary seal where the joint component that provides the secondary seal include relief features (e.g., consider annular recesses proximate an inner perimeter). The FEA model 1530 correspond to an assembly with two joint components that provides a primary seal and a secondary seal. Table 1, below, provides some examples of numerical results from the numerical analyses (e.g., finite element analyses).

TABLE 1

| Example FEA Model-Based Results. | | |
| --- | --- | --- |
| Example Assembly | Force Reaction (N) | Relative Difference (%) |
| Single, Primary Seal | 235156.4 | |
| Secondary Seal w/Relief | 242276.9 | 3.03 |
| Secondary Seal w/o Relief | 243435 | 3.50 |

As indicated in Table 1, the presence of the relief (e.g., or reliefs) on the joint component that operates to form a secondary seal can provide an acceptable increase in clamping force (e.g., bolt load) for mating of approximately 3 percent; whereas, without a relief, the clamping force (e.g., bolt load) for mating may be greater.

Figure 16:
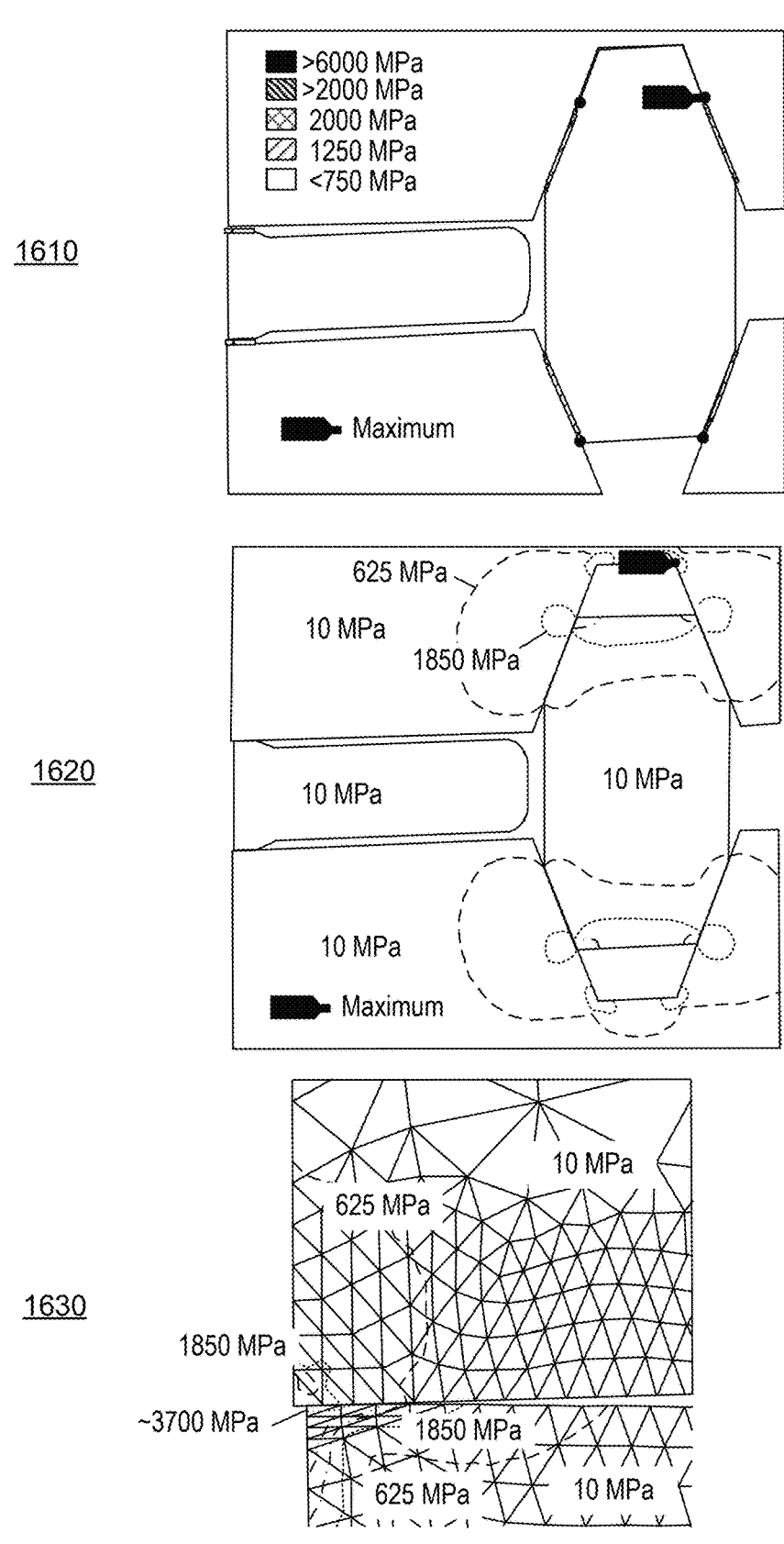
FIG. 16 illustrates example graphics of finite element analysis results.

FIG. 16 shows examples of FEA results 1610, 1620, and 1630 for an assembly that includes joint components such as the joint components 370 and 380; however, where the joint component that operates as a secondary seal does not include one or more reliefs. As shown, a secondary seal may be formed at the inner perimeter, however, with some amount of joint component stress and flange component stress.

Figure 17:
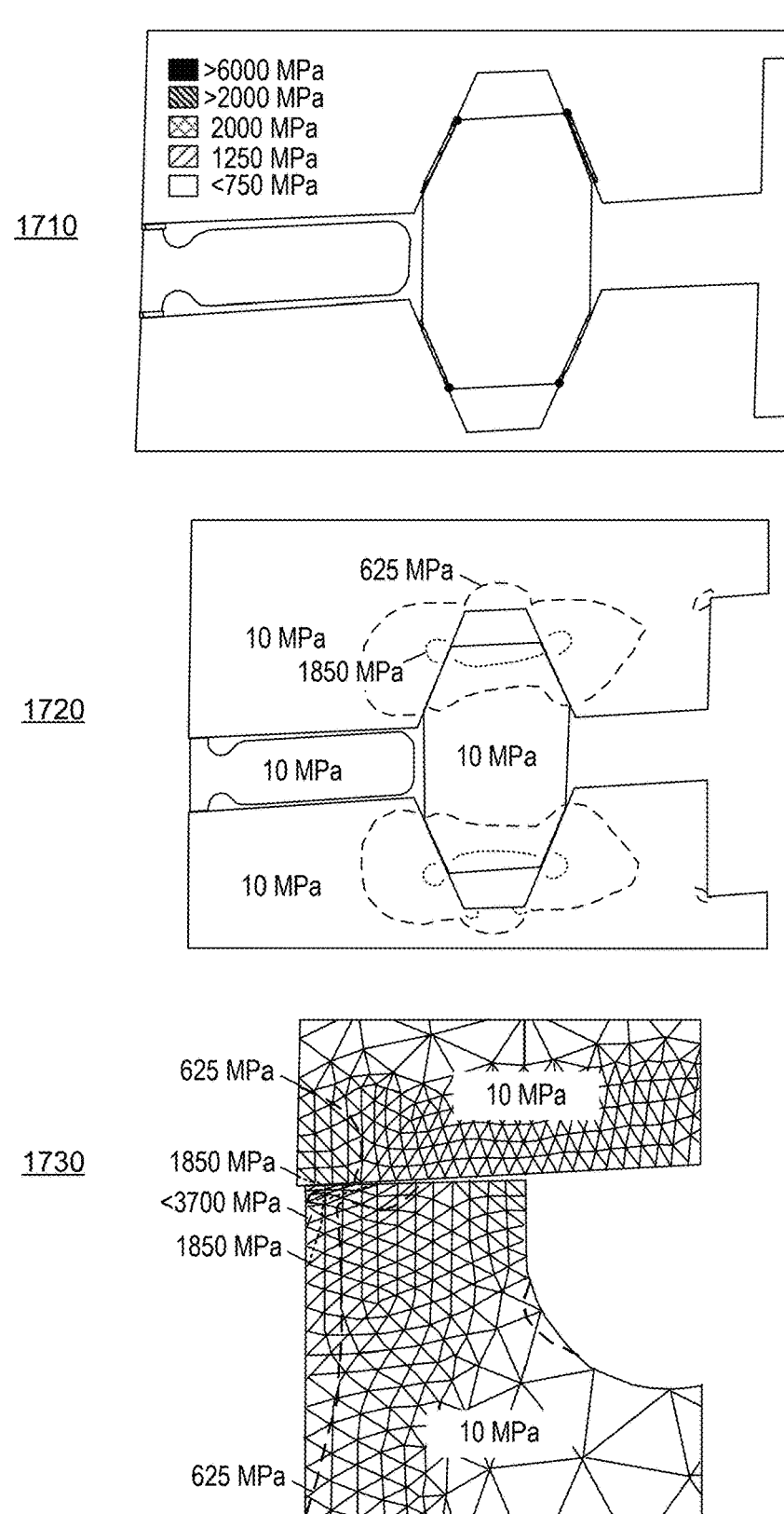
FIG. 17 illustrates example graphics of finite element analysis results.

FIG. 17 shows examples of FEA results 1710, 1720, and 1730 for an assembly that includes joint components such as the joint components 370 and 380 where the joint component that operates as a secondary seal that does include one or more reliefs. As shown, a secondary seal may be formed at the inner perimeter, with some amount of joint component stress and flange component stress; however, such stress or stresses may be less than without the one or more reliefs. As explained, through use of one or more reliefs, such stress may be reduced, which may be demonstrated through use of a lesser clamping force (e.g., bolt load) while still achieve a secondary seal.

While one or more reliefs may slightly increase volume of a space or spaces, the increase in volume may be located proximate to an inner perimeter of a joint component that operates as a secondary seal such that the increase in volume is a distance away from another joint component that operates as a primary seal. Thus, the presence of the joint component that operates as a secondary seal may thereby help to protect the joint component and its seating surfaces that operate as a primary seal (e.g., consider protection against crevice corrosion).

As explained, numerical analyses (e.g., FEA) may be utilized to demonstrate how various features provide for a reduction in corrosion while having acceptably low demands as to reaction force (e.g., bolt load, etc.). As explained with respect to results in Table 1, the total reaction force of the flange joint assembly with the heel seal adaptor is approximately 3 percent higher than a base flange joint assembly. Hence, introduction of a heel seal adaptor on an ASME standard flange assembly may be utilized for field applications without substantial deviations from ASME specifications. As an example, reaction force may be tailored using one or more dimensions, types of material, etc., which may provide for a desirable gasket load while ensuring that a secondary heel seal adaptor seal joint remains intact at and for some time after installation. As explained, a joint component that operates to form a secondary seal may help to delay one or more issues that may occur with respect to a primary seal.

Figure 18:
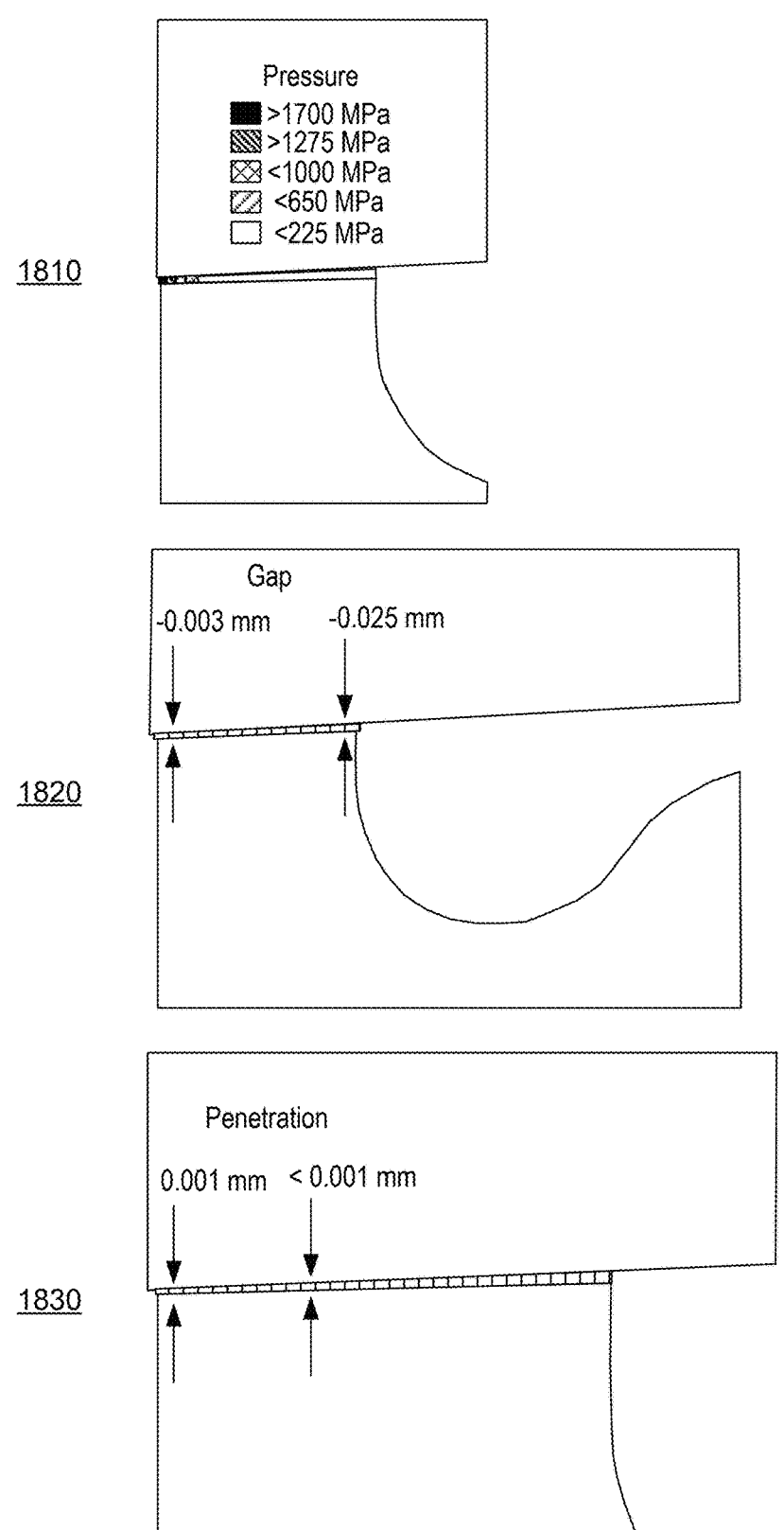
FIG. 18 illustrates example graphics of finite element analysis results.

FIG. 18 shows examples of FEA results 1810, 1820, and 1830 for an assembly that includes joint components such as the joint components 370 and 380 where the joint component that operates as a secondary seal that does include one or more reliefs. In particular, the results 1810 show contact pressure of a heel seal adaptor with a pressure load of 20.7 MPa (3000 psig); the results 1820 show a contact gap of a heel seal adaptor with a pressure load of 20.7 MPa (3000 psig); and the results 1830 show contact penetration of a heel seal adaptor with a pressure load of 20.7 MPa (3000 psig).

As explained, crevice corrosion relies on the presence of a crevice, electrolyte and oxygen in order for crevice corrosion to occur, which may occur even on corrosion resistant alloys. As explained, a joint component may be introduced to form a secondary seal that may provide for restricting fluid recirculation at another joint component that forms a primary seal such that crevice corrosion is hindered (e.g., delayed, etc.).

As an example, an assembly can include a metallic equipment flange that includes an axially extending bore wall, a seal recess disposed at a radial distance from the axially extending bore wall, and a radially extending surface between the axially extending bore wall and the seal recess; a metallic pipe flange that includes an axially extending bore wall, a seal recess disposed at a radial distance from the axially extending bore wall, and a radially extending surface between the axially extending bore wall and the seal recess; a metallic joint component seated in part in each of the seal recesses to form a primary seal and to create an axial gap between the radially extending surfaces with a gap dimension; and a disk-shaped joint component seated radially inwardly from the metallic joint component, where the disk-shaped joint component includes axially extending lips at an inner perimeter that contact the radially extending surfaces to form a secondary seal therebetween, and where the disk-shaped joint component includes a disk portion that extends radially outwardly from the axially extending lips with a disk portion axial dimension that is less than an axial dimension of the axially extending lips and less than the gap dimension.

As an example, an assembly may be a two-flange assembly where each of the two flanges includes a flange face, which may be a first flange face of a first flange and a second flange face of a second flange where the first flange face and the second flange face mate to form a joint that may be secured using one or more fasteners (e.g., bolts, etc.). In such an example, the first flange may be a metallic equipment flange that includes a first axially extending bore wall, a first seal recess disposed at a radial distance from the first axially extending bore wall, and a first radially extending surface between the first axially extending bore wall and the first seal recess and the second flange may be a second metallic pipe flange that includes a second axially extending bore wall, a second seal recess disposed at a radial distance from the second axially extending bore wall, and a second radially extending surface between the second axially extending bore wall and the second seal recess. In such an example, the assembly can include a metallic joint component seated in part in each of the first and the second seal recesses to form a primary seal and to create an axial gap between the first and the second radially extending surfaces with a gap dimension and the assembly can include a disk-shaped joint component seated radially inwardly from the metallic joint component, where the disk-shaped joint component includes axially extending lips at an inner perimeter that contact respective ones of the first and the second radially extending surfaces to form a secondary seal therebetween, and where the disk-shaped joint component includes a disk portion that extends radially outwardly from the axially extending lips with a disk portion axial dimension that is less than an axial dimension of the axially extending lips and less than the gap dimension of the axial gap between the first and the second radially extending surfaces of the first flange and the second flange.

As an example, a metallic equipment flange can be a multi-phase flow meter flange. In such an example, a gap dimension an axial gap between the metallic equipment flange and another flange may be greater than approximately 0.1 mm and less than approximately 18 mm.

As explained, a gap dimension of an axial gap between two flanges may depend in part on a flange size. For example, mated NPS ½ flanges may have a smaller gap dimension than mated NPS 1½ flanges. As an example, class 1500 flanges of NPS ½ to NPS 1½ may utilize four bolts (e.g., ¾ inch diameter, ⅞ inch diameter, 1 inch diameter) where a flange diameter may be from approximately 4.75 inches (NPS ½) to approximately 7 inches (NPS 1½). As an example, an NPS 1½ flange may have a flange diameter of approximately 178 mm such that an axial gap between mated NPS 1½ flanges may be less than 10 percent of the flange diameter (e.g., less than approximately 18 mm) or may be less than 5 percent of the flange diameter (e.g., less than approximately 9 mm) or may be less than 3 percent of the flange diameter (e.g., less than approximately 5 mm).

As an example, a disk-shaped joint component can include an outer perimeter that forms a contact with an inner perimeter of the metallic joint component. In such an example, the inner perimeter of the metallic joint component may locate the disk-shaped joint component in an assembly. As an example, a contact may form a seal. As an example, a contact may be an interference fit contact (e.g., press-fit, thermal-fit, etc.).

As an example, a disk-shaped joint component can include an outer perimeter that does not contact an inner perimeter of a metallic joint component. In such an example, an annular gap may exist between the outer perimeter of the disk-shaped joint component and the inner perimeter of the metallic joint component.

As an example, a disk-shaped joint component may include an outer perimeter defined by a single radius. As an example, a disk-shaped joint component may include an outer perimeter defined by multiple radii. As an example, a disk-shaped joint component may include an outer perimeter defined by one or more radii.

As an example, a disk-shaped joint component can include at least one relief feature adjacent to axially extending lips of the disk-shaped joint component. In such an example, the disk-shaped joint component can include relief features adjacent to the axially extending lips, where, for example, the relief features define an axial dimension that is less than a disk portion axial dimension of the disk-shaped joint component.

As an example, an assembly may include a protective fluid disposed between a disk-shaped joint component and a radially extending surface of a metallic equipment flange or a metallic pipe flange.

As an example, an assembly may include a protective fluid disposed between a disk-shaped joint component and a radially extending surface of a metallic equipment flange and a radially extending surface of a metallic pipe flange.

As an example, an assembly may include bolts that clamp a metallic equipment flange to a metallic pipe flange. In such an example, the bolts may be utilized with corresponding nuts, threaded bores, etc.

As an example, a disk-shaped joint component can include metal. For example, a disk-shaped joint component may be a metallic component. In such an example, a metallic alloy may be utilized.

As an example, a disk-shaped joint component can include a non-metal. For example, consider a polymeric disk-shaped joint component. As an example, a disk-shaped joint component may include one or more polymeric materials (e.g., one or more polymers). For example, consider a thermoplastic polymer, which may be or include, for example, a PAEK family thermoplastic polymer. As an example, a non-metal may be or include a PAEK family thermoplastic polymer.

As an example, a method can include in an assembly that includes: a metallic equipment flange that includes an axially extending bore wall, a seal recess disposed at a radial distance from the axially extending bore wall, and a radially extending surface between the axially extending bore wall and the seal recess; a metallic pipe flange that includes an axially extending bore wall, a seal recess disposed at a radial distance from the axially extending bore wall, and a radially extending surface between the axially extending bore wall and the seal recess; a metallic joint component seated in part in each of the seal recesses to form a primary seal and to create an axial gap between the radially extending surfaces with a gap dimension; and a disk-shaped joint component seated radially inwardly from the metallic joint component, where the disk-shaped joint component includes axially extending lips at an inner perimeter that contact the radially extending surfaces to form a secondary seal therebetween, and where the disk-shaped joint component includes a disk portion that extends radially outwardly from the axially extending lips with a disk portion axial dimension that is less than an axial dimension of the axially extending lips and less than the gap dimension, via the axially extending lips and the disk portion of the disk-shaped joint component, hindering crevice corrosion with respect to at least the seal recess of the metallic equipment flange. As explained, a component such as, for example, a disk-shaped joint component, can provide for forming a robust flange joint, which may provide for longer service life, an ability to withstand harsher conditions, etc.

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An assembly comprising:
   a metallic equipment flange that comprises an axially extending bore wall, a seal recess disposed at a radial distance from the axially extending bore wall, and a radially extending surface between the axially extending bore wall and the seal recess;
   a metallic pipe flange that comprises an axially extending bore wall, a seal recess disposed at a radial distance from the axially extending bore wall, and a radially extending surface between the axially extending bore wall and the seal recess;
   a metallic joint component seated in part in each of the seal recesses to form a primary seal and to create an axial gap between the radially extending surfaces with a gap dimension;
   a disk-shaped joint component seated radially inwardly from the metallic joint component, wherein the disk-shaped joint component comprises axially extending lips at an inner perimeter that contact the radially extending surfaces to form a secondary seal therebetween, and wherein the disk-shaped joint component comprises a disk portion that extends radially outwardly from the axially extending lips with a disk portion axial dimension that is less than an axial dimension of the axially extending lips and less than the gap dimension; and
   a protective fluid disposed between the disk-shaped joint component and the radially extending surface of at least one of the metallic equipment flange or the metallic pipe flange.

2. The assembly of claim 1, wherein the metallic equipment flange comprises a multi-phase flow meter flange.

3. The assembly of claim 1, wherein the gap dimension is greater than approximately 0.1 mm and less than approximately 18 mm.

4. The assembly of claim 1, wherein the disk-shaped joint component comprises an outer perimeter that forms a contact with an inner perimeter of the metallic joint component.

5. The assembly of claim 4, wherein the inner perimeter of the metallic joint component locates the disk-shaped joint component in the assembly.

6. The assembly of claim 4, wherein the contact forms a seal.

7. The assembly of claim 4, wherein the contact comprises an interference fit contact.

8. The assembly of claim 1, wherein the disk-shaped joint component comprises an outer perimeter that does not contact an inner perimeter of the metallic joint component.

9. The assembly of claim 8, wherein an annular gap exists between the outer perimeter of the disk-shaped joint component and the inner perimeter of the metallic joint component.

10. The assembly of claim 1, wherein the disk-shaped joint component comprises an outer perimeter defined by a single radius.

11. The assembly of claim 1, wherein the disk-shaped joint component comprises an outer perimeter defined by multiple radii.

12. The assembly of claim 1, wherein the disk-shaped joint component comprises at least one relief feature adjacent to the axially extending lips.

13. The assembly of claim 12, wherein the disk-shaped joint component comprises relief features adjacent to the axially extending lips, wherein the relief features define an axial dimension that is less than the disk portion axial dimension.

14. The assembly of claim 1, wherein the protective fluid is disposed between the disk-shaped joint component and the radially extending surface of the metallic equipment flange or the metallic pipe flange.

15. The assembly of claim 1, wherein the protective fluid is disposed between the disk-shaped joint component and the radially extending surface of the metallic equipment flange and the radially extending surface of the metallic pipe flange.

16. The assembly of claim 1, comprising bolts that clamp the metallic equipment flange to the metallic pipe flange.

17. The assembly of claim 1, wherein the disk-shaped joint component comprises metal.

18. The assembly of claim 1, wherein the disk-shaped joint component comprises a non-metal.

19. The assembly of claim 18, wherein the non-metal comprises a PAEK family thermoplastic polymer.

20. A method comprising:

in the assembly of claim 1, via the axially extending lips and the disk portion of the disk-shaped joint component, hindering crevice corrosion with respect to at least the seal recess of the metallic equipment flange.

* * * * *